(12) United States Patent
Buchin

(10) Patent No.: US 7,732,743 B1
(45) Date of Patent: Jun. 8, 2010

(54) LOW-PHOTON-FLUX IMAGE ACQUISITION AND PROCESSING TOOL

(76) Inventor: Michael Paul Buchin, 723 Southampton Dr., Palo Alto, CA (US) 94303

( * ) Notice: Subject to any disclaimer, the term of this patent is extended or adjusted under 35 U.S.C. 154(b) by 917 days.

(21) Appl. No.: 11/445,834

(22) Filed: Jun. 1, 2006

Related U.S. Application Data

(60) Provisional application No. 60/686,953, filed on Jun. 3, 2005.

(51) Int. Cl.
*H01L 27/00* (2006.01)

(52) U.S. Cl. .............. 250/208.1; 250/214.1; 356/317; 382/154

(58) Field of Classification Search .............. 250/208.1, 250/214.1, 214 R, 214 VT, 573; 356/317, 356/318, 417, 73; 382/154, 110; 715/781, 715/764, 828
See application file for complete search history.

(56) References Cited

U.S. PATENT DOCUMENTS

| | | | |
|---|---|---|---|
| 6,614,452 B1 | 9/2003 | Cable | |
| 6,775,567 B2 | 8/2004 | Cable et al. | |
| 6,894,289 B2 | 5/2005 | Nilson et al. | |
| 6,919,919 B2 | 7/2005 | Nelson et al. | |
| 6,922,246 B2 | 7/2005 | Nilson et al. | |
| 2003/0135092 A1* | 7/2003 | Cline et al. | 600/160 |
| 2004/0233545 A1* | 11/2004 | Jiang et al. | 359/726 |
| 2005/0149877 A1* | 7/2005 | Rice et al. | 715/764 |
| 2005/0219407 A1 | 10/2005 | Rice et al. | |
| 2006/0081770 A1 | 4/2006 | Buchin | |
| 2007/0080305 A1 | 4/2007 | Maitrejean et al. | |

OTHER PUBLICATIONS

Imaging Technology Update, vol. 1, Issue 1, Newsletter of Stanford Photonics, Inc., (Fall 2004) pp. 1 and 2.
Imaging Technology Update, vol. 2, Issue 2, Newsletter of Stanford Photonics, Inc., (Spring 2005) pp. 1 and 2.
Imaging Technology Update, vol. 2, Issue 1, Newsletter of Stanford Photonics, Inc., (Winter 2005) pp. 1 and 2.
B.W. Rice et al., "In vivo imaging of light-emitting probes", Journal of Biomedical Optics vol. 6, No. 4, pp. 432-440 (Oct. 2001).

\* cited by examiner

*Primary Examiner*—Thanh X Luu
*Assistant Examiner*—Francis M Legasse, Jr.
(74) *Attorney, Agent, or Firm*—Treyz Law Group; G. Victor Treyz; David C. Kellogg

(57) ABSTRACT

A camera system uses a highly sensitive camera such as an intensified charge-coupled-device camera to acquire images. An image acquisition and processing tool can place the camera in a low-sensitivity mode and a high-sensitivity mode. In the low-sensitivity mode, a reference image may be acquired of a target that is illuminated by a light-emitting-diode. In the high sensitivity mode, low-photon-flux image data frames are acquired using a charge-coupled-device image sensor in the camera. The image acquisition and processing tool displays the acquired image data frames on top of the reference image in real time, so that a user is provided with immediate visual feedback. The image acquisition and processing tool has image preprocessing filters for enhancing image quality such as a sensor noise threshold filter, a cosmic ray filter, and a photon shape optimization filter. Pipeline filters may be used to further process acquired image data frames.

26 Claims, 15 Drawing Sheets

US 7,732,743 B1

LOW-PHOTON-FLUX IMAGE ACQUISITION AND PROCESSING TOOL

This application claims the benefit of provisional patent application No. 60/686,953, filed Jun. 3, 2005, which is hereby incorporated by reference herein in its entirety.

BACKGROUND

This invention relates to image acquisition and processing, and more particularly, to the acquisition and processing of low-photon-flux images.

Cameras have been developed that are sensitive to low light levels. Cameras of this type may be used in a variety of fields. As an example, cameras that are sensitive to low light levels may be used in biological studies such as studies in which luminescence or florescence is measured. Some biological studies that involve low light level measurements involve monitoring bioluminescent targets. Bioluminescent targets may include live animals and other biological specimens.

Accurate studies require sensitive cameras. However, even if a highly sensitive camera is used to capture images, image data can be obscured by noise. Moreover, conventional measurement schemes generally require long integration times before signal strengths have developed sufficiently to be displayed for a user. During the long capture times associated with such schemes a background image can be displayed, but no low-light image data can be presented. After completion of an exposure that is long enough for a low-light image to build up its signal strength above noise obscuration levels, low-light image data can be displayed, but until the long exposure is complete, there is no way to provide visual feedback of low-light image data to the user.

It would therefore be desirable to provide improved image acquisition and processing systems that handle low-light imaging applications.

SUMMARY

In accordance with the present invention, an image acquisition and processing system is provided that has a computer-implemented image acquisition and processing tool. The system uses a high-sensitivity camera such as an intensified charge-coupled-device (ICCD) camera to capture low-photon-flux images. The ICCD camera acquires image data frames at typical frame rates of about 0.1 to 100 frames per second. Image degradation from pixel saturation effects can be reduced by selecting a frame rate that is sufficiently fast. Frame rates are preferably used which are fast enough to allow frames to be collected that contain discrete isolated single photon events. This preserves image capture linearity and allows for accurate processing of acquired image data frames by downstream image processing functions. Moreover, users are able to view captured image data in real time.

The system preferably has a light-tight enclosure in which image data is acquired. A target is placed in the light-tight enclosure. A background image (sometimes called a reference image) may be acquired by illuminating the target with a light source such as a light-emitting diode. Low-light image data frames may be captured after the light source has been turned off. Typical targets include bioluminescent samples. For example, the target may be a live animal such as a mouse. During reference image acquisition, the mouse is illuminated with the light source and an image of the mouse is acquired. During low-light image data frame acquisition, the light source is turned off and low-photon-flux data from a bioluminescent portion of the mouse is acquired.

The camera has a photocathode and a microchannel plate that are controlled by a controller. The image acquisition and processing tool can direct the controller to adjust a photocathode gating signal and a high-voltage gain control signal for the microchannel plate. By making these adjustments, the image acquisition and processing tool may place the camera in a low-sensitivity mode or a high-sensitivity mode.

In a typical scenario, a reference image of the target is acquired while the light source is on and the camera is operating in the low-sensitivity mode. A user of the tool then initiates data capture operations. After the reference image has been acquired, the camera is placed in high-sensitivity mode and the light source is turned off. Luminescence signals or other low-photon-flux signals from the target are captured in a series of image data frames from the image sensor of the camera. The image acquisition and processing tool uses preprocessing filters such as a sensor noise threshold filter, a cosmic ray filter, and a photon shape optimization filter to enhance image quality for the acquired image data frames.

The tool forms a blended image that combines the reference image and the acquired image data frames. Image data frames can be displayed on top of the reference image immediately to provide visual feedback for a user.

The image acquisition and processing tool may use image pipeline processing filters such as an integration filter, a data extraction filter, an averaging filter, a spatial integration filter, and an image manipulation filter to further process acquired images. Image data may be stored and played back for subsequent review by a user. The data extraction point from which the image data is tapped for storage may be selected by the user. The user may activate and inactivate subsets of the image processing filters to adjust the way in which new images and stored images are processed.

The low-photon-flux image data frames that are acquired with the camera contain photons that have been received from the target and contain noise signals such as cosmic ray noise signals. The frames are preferably acquired at a frame rate that is sufficiently fast to ensure that the photons are individually resolved within each acquired image data frame. Using the preprocessing filters, the acquired image data frames are processed to remove the noise signals. For example, cosmic ray noise can be removed either by dropping frames or by removing cosmic ray noise from a particular region of a frame. During preprocessing, the individually resolved photons are retained. Because noise is separated from the individually resolved photons, the image data frames contain high quality data for subsequent processing by the pipeline processing filters. The image data frames that have been processed to remove the noise signals may be displayed in real time in combination with the reference image.

Further features of the invention, its nature and various advantages will be more apparent from the accompanying drawings and the following detailed description of the preferred embodiments.

DETAILED DESCRIPTION

The present invention relates to systems and methods for acquiring and processing images. Images are acquired and processed using an image acquisition and processing system. The system includes a camera and an image acquisition and processing tool. The image acquisition and processing tool may be implemented using a computer system. Image acquisition and processing tasks are typically shared between the dedicated hardware in the camera and more general purpose resources in the computer.

Figure 1:
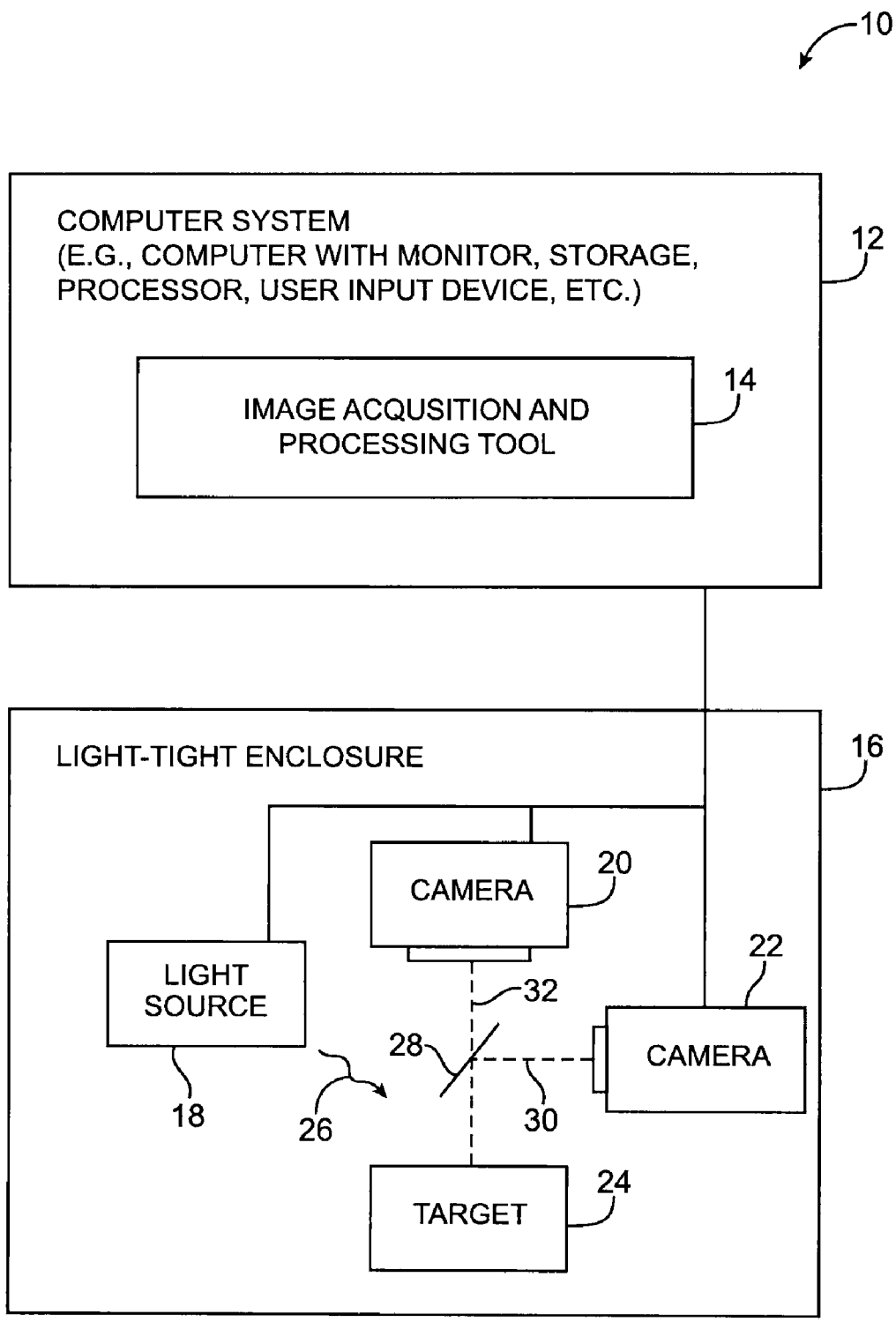
FIG. 1 is a diagram of an illustrative image acquisition and processing system in accordance with the present invention.

An illustrative image acquisition and processing system 10 is shown in FIG. 1. Image acquisition and processing system 10 includes a computer system 12. Computer system 12 may include one or more computers. In environments in which system 12 includes more than one computer, the computers may be connected by local and wide-area networks.

Image acquisition and processing tool 14 is implemented on computer system 12. Tool 14 may be formed from one or more computer programs. In a typical installation, most or all of the software components of tool 14 are implemented using a single image acquisition and processing program. If desired, however, the functions of the image acquisition and processing tool 14 may be provided by a suite of programs, which may be located on a common hardware platform or which may be distributed across multiple hardware platforms.

Image acquisition and processing tool 14 gathers images from one or more cameras such as camera 20 and camera 22. Camera 20 may be, for example, a highly sensitive intensified charge-coupled device (ICCD) camera or other suitable camera capable of making measurements under low-light conditions. The camera 20 is preferably capable of capturing image frames in which individual photons are resolved. The photon gain and signal-to-noise ratio of camera 20 are preferably high enough that one photon registers at least two to three times larger and preferably 10-20 times larger than the noise floor of CCD image sensor 48. With one suitable arrangement, camera 20 is characterized by a dark count of less than 100 and typically between 25 and 50 imaged photon events per 1 cm×1 cm area per second. Camera 20 is preferably capable of detecting without ambiguity one single photon per pixel or per defined pixel area (e.g., a group of pixels such as a 4×4 group of pixels).

Low photon-flux measurements require a dark environment, so camera 20 is typically housed in a light-tight enclosure 16. Enclosure 16 may be a darkened room, a light-tight box, or any other suitable structure for blocking stray light from camera 20.

Camera 20 makes low-light images of image target 24. In general, any suitable type of sample may be imaged. For example, target 24 may be a live animal such as a mouse that has been provided with a photoactive reporter gene expressing luciferase. Target 24 may also be a luminescent cell culture. Biological specimens such as cells are often housed using a well-plate structure containing numerous circular wells. Target 24 may also be a non-biological specimen, such as a solution in a physical chemistry experiment.

The low-photon-flux measurements made by system 10 may be luminescence measurements, florescence measurements, or any other suitable low light measurements. Luminescence measurements are sometimes described herein as an example.

To orient target 24, it is typically desirable to illuminate target 24 with a relatively bright light source 18. While light source 18 is on, no low photon flux measurements are made with camera 20. Rather, tool 14 captures a reference image.

Light source 18 may be, for example, a light-emitting diode (LED). Other sources may be used if desired, but LED sources are advantageous because of their relatively fast response time. A red LED may be particularly useful, because this type of source avoids the long decay times (afterglow) associated with many other LEDs (e.g., white LEDs and shorter wavelength LEDs such as blue LEDs). Moreover, red LEDs are less likely to induce undesirable florescence in target 24 than shorter wavelength light sources.

The reference image may be captured using highly-sensitive camera 20 or may be captured using an optional lower sensitivity secondary camera 22. If two cameras are used, a beamsplitter 28 or other suitable optical coupler may be used to direct the reference image to camera 22, as shown by path 30. Beamsplitter 28 may allow luminescence from target 24 to pass to camera 20 along path 32. If desired, movable mirror may be used in place of beamsplitter 28. Alternatively, camera 22 may capture images from a slightly off-axis position.

In a single-camera arrangement, camera 20 is operated in two modes. In high-sensitivity mode, camera 20 is adjusted so that low-photon-flux video images (i.e., images containing tens or hundreds of photons per frame) can be captured. In low-sensitivity mode, while target 24 is illuminated by light 26 from light source 18, camera 20 captures a grayscale reference image of target 24 (i.e., an image containing many photons per pixel).

During some modes of operation, tool 14 preferably blends the low-sensitivity grayscale reference image with the high-sensitivity single-photon data. Because camera 20 is highly sensitive and because data is captured in frames, it is generally not necessary to wait long periods of time to build up a sufficiently bright data signal to overlay with the reference images. This provides the user with immediate feedback, so that placement of the target image can be adjusted, a data acquisition run can be aborted, tool settings can be changed, or other suitable action can be taken.

Figure 2:
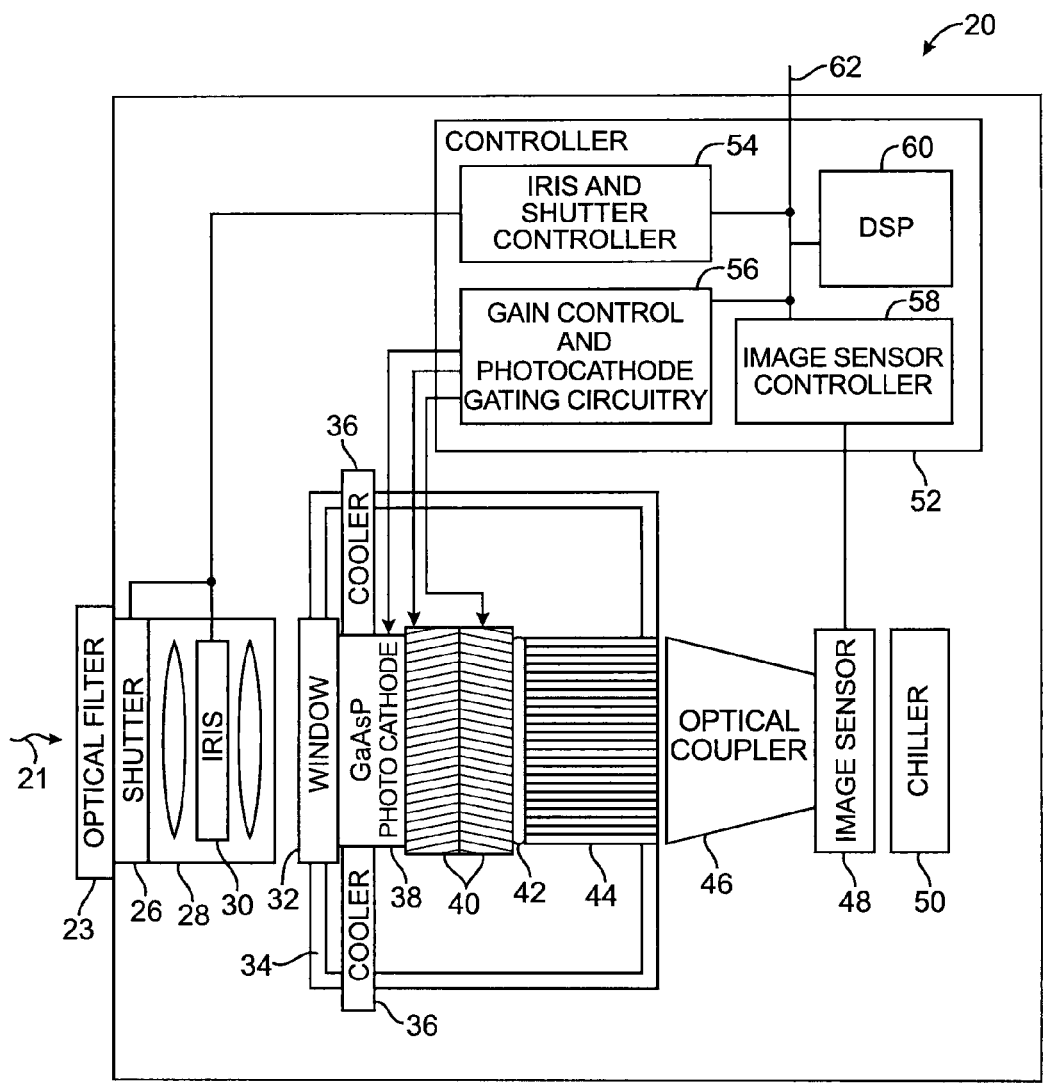
FIG. 2 is a diagram of an illustrative camera in accordance with the present invention.

An illustrative camera 20 that may be used in system 10 is shown in FIG. 2. As shown in FIG. 2, camera 20 may receive light 21 from the target. An optional optical bandpass filter 23 may be used to reduce extraneous signals. The bandpass wavelength range is preferably selected so that the luminescence signal from the target is not attenuated, whereas background signals from light leaking into enclosure 16 and light source 18 are strongly attenuated.

Mechanical shutter 26 may be used to block light from entering camera 20. Lens 28 is used to focus the camera 20 on the target 24. Lens 28 may have an iris 30 for adjusting the amount of light gathered by camera 20 and for adjusting the depth of field of the acquired image. Light that has been gathered by lens 28 passes through a window 32 in a sealed chamber 34. Chamber 34 is preferable under vacuum. Coolers 36 such as Peltier effect coolers are used to cool photocathode 38 to reduce noise. Coolers 36 may cool photocathode 38 to about $-20°$ C.$-0°$ C. With one suitable arrangement, photocathode 38 is formed from GaAsP, as this type of photocathode exhibits a high quantum efficiency and low intrinsic dark counts. If desired, other photocathode materials may be used. GaAsP photocathodes are sensitive between wavelengths of about 500-700 nm.

As photons strike photocathode 38, photocathode 38 converts the photons to electrons. The electrons are accelerated using a dual microchannel plate 40 to which a high voltage has been applied (e.g., a voltage of about 1000-2000 volts). Microchannel plate 40 typically exhibits a gain of about $10^4$ to $10^6$, which can be adjusted by adjusting the applied high voltage. Multiplied electrons are produced when individual electrons strike the walls of the plates. As shown in the cross-sectional view of FIG. 3, the microchannels in each plate 30 are tilted away from each other (i.e., the microchannel plates are chevroned) to reduce ion feedback generated noise on phosphor 42.

The electrons and ions from plates 30 strike the microchannel plate strike phosphor 42 and are converted into photons. These photons are provided to image sensor 48 by optical coupling components. In the illustrative arrangement shown in FIG. 2, light from sensor 42 is routed to sensor 48 by fiber bundle and optical coupler 46 (i.e., a fiberoptic taper).

Image sensor 48 is preferably a high-resolution semiconductor sensor such as a charge-coupled device (CCD) sensor. The sensor 48 is preferably able to capture thousands or millions of pixels of image data at a frame rate of about 0.1-100 frames per second while unambiguously resolving individual photons. Chiller 50 may be used to cool sensor 48 to improve its signal-to-noise ratio.

The operation of camera 20 is controlled using camera controller 52. Controller 52 converts images from the image sensor into a video signal for processing by tool 14. The video signal includes frames of image data. The frames are acquired at an adjustable frame rate. The controller 52 receives control signals from the tool 14 to vary the exposure time of the camera (i.e., the frame rate governed by the read-out rate of image sensor 48). In a typical scenario, the default frame rate is 30 frames/second and can be adjusted by the user to a desired frame rate of between about 0.1-100 frames/second. In general, higher frame rates in which individual photons can still be resolved are preferred over lower frame rates, because at high frame rates the noise contribution to each frame from sources such as cosmic rays is reduced, while the signal strength of each photon strike is undiminished. Because individual detected photons are unaffected by the frame rate, whereas cosmic ray noise per frame is reduced in proportion to increasing frame rate, using higher frame rates helps reduces noise sources of this type. Moreover, the possibility of two or more photons striking the same pixel in a frame (pixel saturation) is reduced at higher frame rates.

The image acquisition and processing tool 14 and camera 20 allow easy discrimination of single photon data from noise components such as CCD noise and cosmic rays before an image of integrated frames is formed. The camera 20 preferably operates at frame rates sufficiently high to capture frames containing discrete isolated photon events. By assuring discrete photon events in each frame, linear summation and accurate image processing can be achieved.

Controller 50 has iris and shutter controller 54 for controlling the actuation of shutter 26 and the size of iris 30. Gain control and photocathode gating circuitry 56 turns the photocathode 38 on and off, is used to adjust the duty cycle of the photocathode's gating signal, and is used to adjust the gain produced by microchannel plate 40. Image sensor controller 58 serves as an interface for image sensor 48. An optional digital signal processor 60 or other suitable control electronics in controller 52 may be used to preprocess image signals from controller 58. The use of complex hardware in controller 52 such as a digital signal processor 60 helps to reduce the processing burden on tool 14, but adds system cost. Path 62 is used to convey image signals from camera 20 to tool 14 and computing equipment 12 and is used to convey control signals from tool 14 and equipment 12 to camera 20.

Because the photocathode 38 and microchannel plates 40 intensify the signal captured by CCD sensor 48, cameras of the type shown in FIG. 2 are sometimes referred to as intensified CCD cameras or ICCD cameras. ICCD cameras, and particularly ICCD cameras of the type shown in FIG. 2, produce high-quality images in low light environments. Image data frames can be acquired by the camera in which individual photon strikes are resolved. Further image quality enhancements are provided using software filters.

Figure 3:
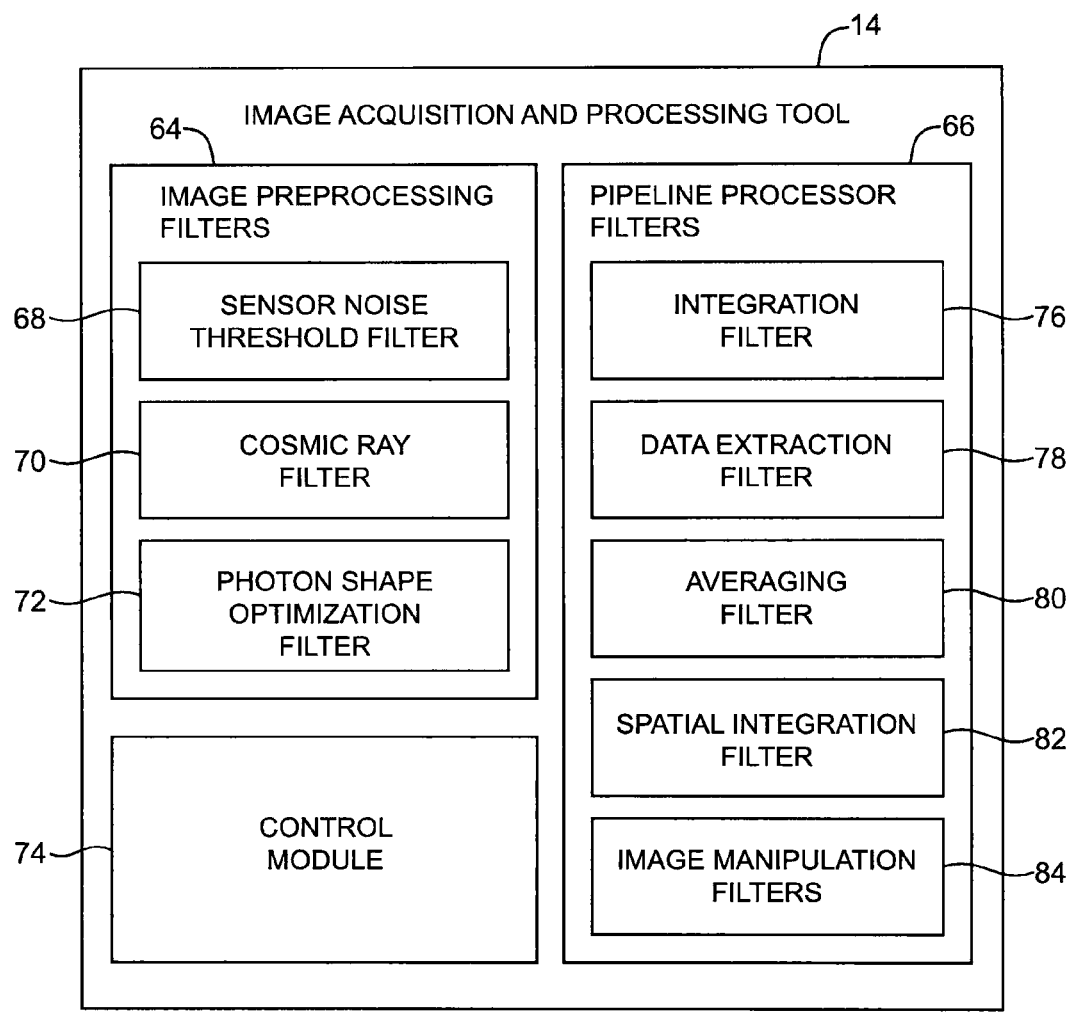
FIG. 3 is a diagram of illustrative software components used in an image acquisition and processing tool in accordance with the present invention.

As shown in FIG. 3, image acquisition and processing tool 14 may have image preprocessing filters 64 and pipeline processors 66. Image processing filters 64 process raw camera data from camera 20 and produce a clean, low noise camera signal. Pipeline processor filters 66 perform optional image manipulation functions that enhance the ability of the user to view and use acquired image data (individual frames or groups of frames). A control module 74 provides tool 14 with the ability to adjust filter settings (i.e., to turn some of filters 64 and 66 on and some off) and perform other control operations.

Image preprocessing filters 64 preferably include a sensor noise threshold filter 68 such as a CCD sensor noise threshold filter, a cosmic ray filter 70, and a photon shape optimization filter 72.

Sensor noise threshold filter 68 has an associated noise threshold setting. Signals that fall below the threshold are discarded or receive other suitable treatment. Signals that exceed the threshold are accepted as image data. A default threshold value may be used or, if desired, a user can be provided with an opportunity to textually or graphically edit the threshold value.

Cosmic ray filter 70 identifies spurious signals that are due to cosmic ray strikes and removes these signals from the captured image data. Cosmic rays produce identifiable sensor patterns. In a typical cosmic ray strike, many pixels are saturated and, among the saturated pixels, many pixels are adjacent to each other. When an acquired image is determined to have multiple such saturated pixels, filter 70 may take appropriate corrective action. With one suitable approach, any captured image frame that contains cosmic ray data is discarded. Most frames are not affected by cosmic ray strikes, so the total fraction of frames that are discarded due to cosmic rays is small. With another suitable approach, only a portion of a frame that contains a cosmic ray is discarded. In this type of arrangement, the sensor data that has been corrupted by the cosmic ray strike is discarded, but the rest of the acquired data in the frame is retained, thereby wasting less data.

Photon shape optimization filter 72 performs image enhancement functions on detected photons in the image data. For example, the photon shape optimization filter may perform a centroid calculation to fit a Gaussian curve to a detected photon. Using this curve, the tool 14 may assign a specific location (i.e., an x-y coordinate) and brightness level to the detected photon. The x-y coordinate need not correspond to the center of a pixel in the sensor 48, so photon position accuracy is improved. If desired, the raw image data corresponding to the detected photon can be replaced by an idealized photon pixel brightness profile (i.e., a perfect Gaussian set of pixel intensities matching a curve that has been fit to the raw data) or other suitable set of pixel values.

Pipeline processor filters 66 preferably include an integration filter 76. Filter 76 is used to increase camera sensitivity by combining multiple frames of data. For example, if a single frame of image data contains too few photons to form an identifiable image (e.g., of the luminescence signal), filter 76 may be used to combine the signals from N frames of data to produce an image frame containing N times as many photons (i.e., a sufficient number of photons to form an identifiable image).

Data extraction filter 78 may be used to extract data from user-defined, automatically identified, or default regions of interest (ROI) in the acquired image. If, for example, the target includes a number of wells containing luminescent cells, the user can define the regions in the acquired image that correspond to the wells. Defining the wells in this way allows tool 14 to ignore areas of the image that do not correspond to valid data. The regions of interest that are defined in the image can be used to extract data from acquired frames (e.g., to generate strip charts plotting pixel intensity versus time).

Filter 80 may be used to perform data averaging operations on acquired image frames. Any suitable mathematical averaging technique may be used to average the image frame data. With one suitable approach, a user defines a given number of frames for the tool 14 to average. The tool 14 then computes the average of the preceding given number of frames. By maintaining a running average, the tool 14 is able to reduce noise in the image and improve statistical quality.

Spatial integration filter 82 may be used to increase sensor sensitivity by trading off resolution for sensitivity. Filter 82 groups sets of adjacent pixels together. Because each set of pixels has more area than a single pixel, sensitivity is increased. However, because each set of adjacent pixels is larger than a conventional pixel, sensor resolution is reduced. If desired, depixelation operations may be performed by spatial integration filter, to reduce the pixelation artifacts that might otherwise be introduced when sets of adjacent pixels are grouped together.

Image manipulation filter 84 may be used to process image data prior to display or storage. Manipulations performed by filters 84 include contrast adjustments, brightness adjustments, false coloring, etc. Image manipulation filter 84 preferably includes an adjustable image combiner. The user can use the adjustable image combiner function of filter 84 to select a desired method for blending the reference image with the acquired image data frames (i.e., the user can adjust blending settings for filter 84). For example, the user can turn on and off the reference image. The user can display the acquired image data frames superimposed on top of the reference image. An image may be created in which the reference image and acquired image data frames have adjustable transparency levels. The so-called alpha-blending technique may be used to mix images with various mixing coefficients. This allows the user to highlight the reference image or the acquired image data frames. For example, the user can increase the intensity of displayed photons in the acquired image data frames, so that this signal is highlighted against a grayscale reference image.

The user of tool 14 need not use all of the filters of FIG. 3. Using control module 74, any or all of the filters of FIG. 3 may be inactivated.

Figure 4:
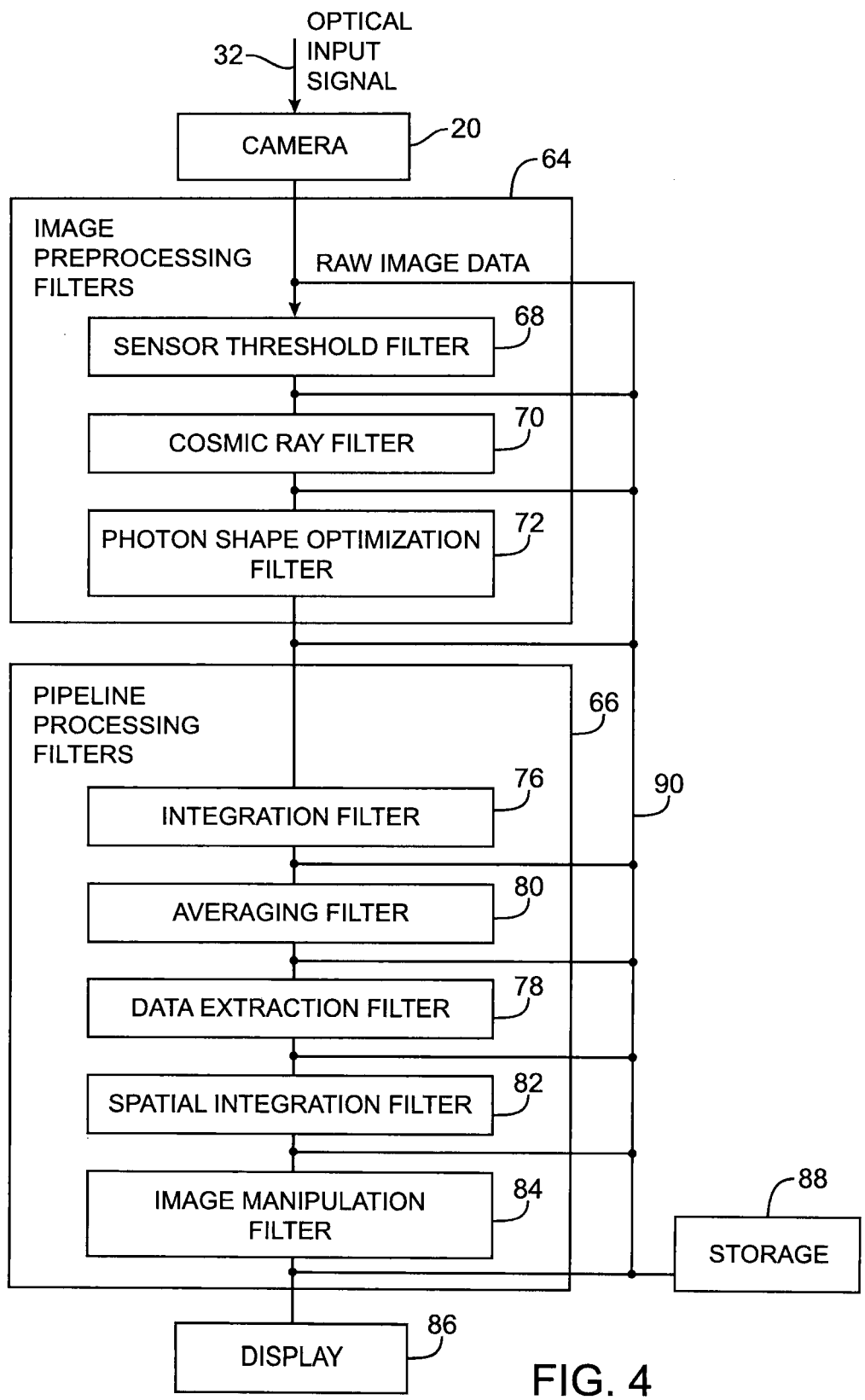
FIG. 4 is a diagram showing how optical signals are captured by a camera and processed using software filters in an image acquisition and processing tool in accordance with the present invention.

In operation, the filters of FIG. 3 are typically cascaded, as shown in FIG. 4. Light from target 24 is received by camera 20 via path 32. Raw image data is processed by sensor threshold filter 68. Following processing by sensor threshold filter 68, image data is processed by cosmic ray filter 70 and photon shape optimization filter 72. The output of image preprocessing filters 64 is provided to pipeline processing filters 66.

Pipeline processing filters 66 receive the preprocessed image data from filters 64. Integration filter 76 performs signal integration by combining frames. This improves sensitivity. A user can adjust the frame accumulation depth using tool 14.

Conventional imaging systems are susceptible to photon saturation effects. During photon saturation conditions, photon strikes on sensor pixels interfere with each other and can result in non-linear measurement results or saturation. Conventional arrangements tend to involve long frame capture times in an attempt to boost sensitivity. As a result, photon saturation effects often degrade conventional imaging results. For example, with image intensities unknown in advance, an operator may choose an exposure that is too long, resulting in pixel saturation. With system 10, in contrast, data is acquired in individual frames rather than in a single extended frame, so acquired images are less susceptible to photon saturation effects. Integration filter 76 can combine frames mathematically after each frame has been captured to boost imaging sensitivity without pixel saturation.

Averaging filter 80 operates on image data received from integration filter 76. Averaging filter 80 can be used to average recently acquired frames to reduce noise. Following averaging by filter 80, processed image data is passed to data extraction filter 78.

Data extraction filter 78, which can operate in the chain of filters either before or after averaging filter 80, receives images that have been averaged by averaging filter 80. Data extraction filter 78 is used to extract data from user-defined or default regions of interest in an image.

Spatial integration filter 82 combines data from adjacent pixels to increase sensor sensitivity. Unlike integration filter 76, which performs temporal integration, spatial integration filter 82 increases sensor sensitivity by performing spatial integration operations. The output of spatial integration filter 82 is passed to image manipulation filter 84.

Image manipulation filter 84 can perform operations such as scaling (e.g., to stretch an image), colorizing (e.g., to add false color to an image), blending (e.g., to combine low-photon-flux data frames with a reference image. If desired, a saved reference image can be processed by filters such as image manipulation filter 84.

In general, not all of the filters of FIG. 4 need to be active. Filters may be inactive (e.g., because these filters have been automatically deactivated by tool 14, manually deactivated by the user of tool 14, or are inactive by default). After processing by the active filters 64 and 66, the processed image data is presented to the user of tool 14 on display 86.

As indicated by paths 90, data may be stored in storage 88 from any of a number of different data extraction points in the chain of image processing filters 64 and 66. If, as an example, it is desired to store raw data in storage 88, raw image data from camera 20 can be routed to storage 88 before being processed by filters 64 and 66. As another example, image data may be extracted and stored after processing by filters 64 but not filters 66. These are merely illustrative examples. In general, image data may be stored in storage 88 at any suitable point in the process flow. Data extraction location(s) may be assigned to tool 14 be default, may be determined dynamically by tool 14 during operation, or may be adjusted by the user.

Storage 88 may be any suitable storage device (e.g., random-access memory, a hard disk drive, an optical drive, a tape drive, etc.). Stored data can be retrieved from storage 88 and played back to the user. If desired, the data that is being played back can be processed by one or more filters 64 and 66. As an example, stored image data that is being played back may be manipulated using image manipulation filters 84, while a user adjusts image manipulation filter settings. This allows a user to choose a false color or contrast setting that displays image data properly. As another example, a user who is playing back a stored raw camera image can adjust the settings of averaging filter 80 to determine which setting produces optimum image quality.

With the arrangement of FIG. 4, low-photon-flux images may be presented to the user on display 88 in real time. These real-time low-photon-flux images may be blended with a reference image. As real-time images are displayed on display 86, the data can be simultaneously recorded to storage 88. The extraction point from which the data is stored can be adjusted, so that a desired amount of processing by filters 64 and 66 is performed prior to storage.

Figure 5:
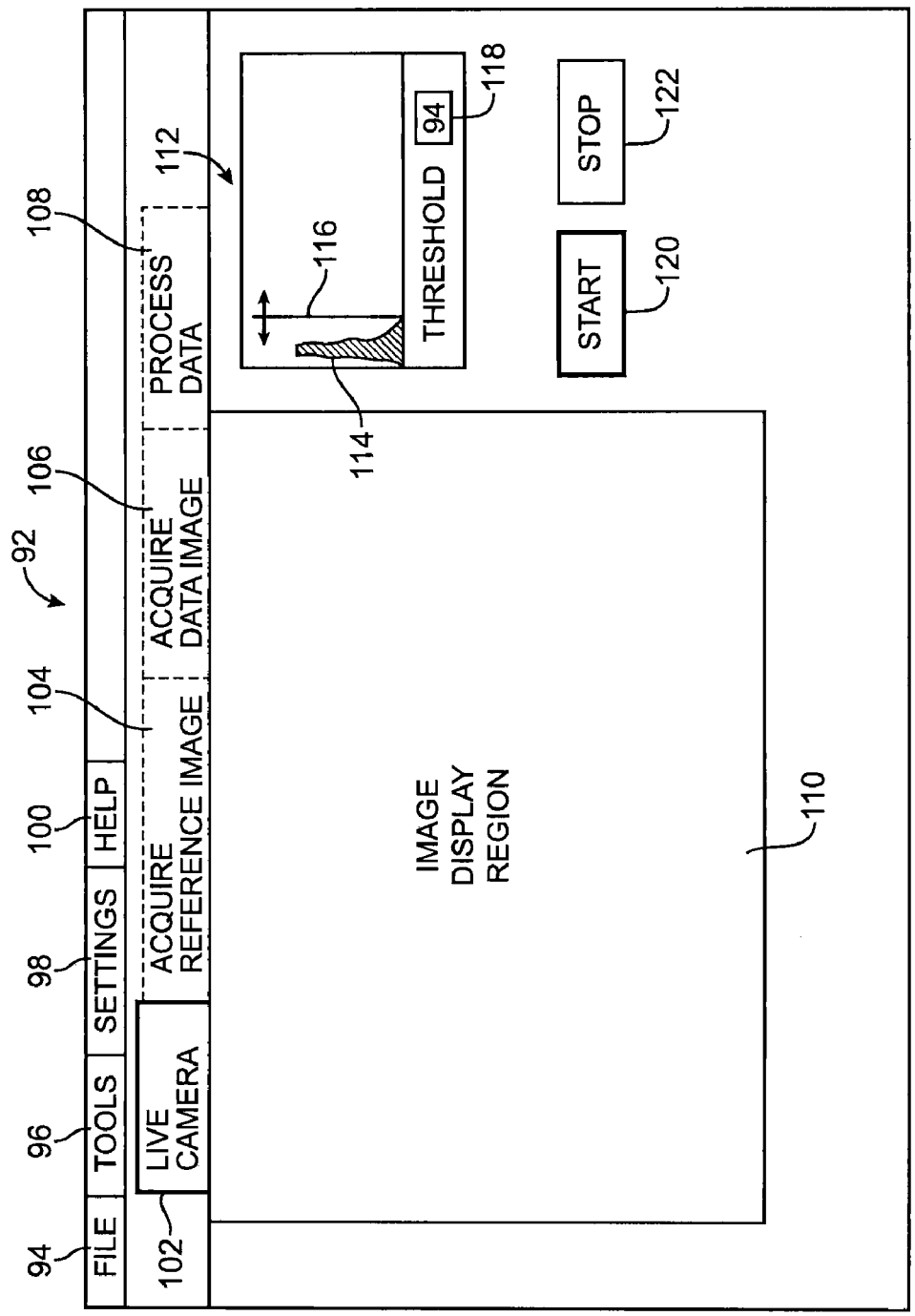
FIG. 5 is an illustrative display screen that may be presented to a user by an image acquisition and processing tool operating in a live camera mode in accordance with the present invention.

Image data that is displayed by tool 14 on display 86 can be displayed using any suitable format. An illustrative display screen 92 that tool 14 can display for a user is shown in FIG. 5. The illustrative screen 92 of FIG. 5, contains selectable options such as file option 94, tools option 96, settings option 98, and help option 100. A user of tool 14 can use the file option 94 to make selections related to storage and file management. Tools option 96 may be used to adjust settings related to image blending between a reference image and a low-photon-flux data image (e.g., transparency level, blending mode, etc.). Settings option 98 can be used to select a desired camera frame rate and resolution.

Tabs such as tabs 102, 104, 106, and 108 may be used to toggle tool 14 between different modes of operation. When tab 104 is selected, tool 14 displays an acquire reference image screen in which a reference image (i.e., an image acquired when target 24 of FIG. 1 is illuminated by light source 18) is displayed. When tab 106 is selected, tool 14 displays an acquire data image screen. The acquire data image screen contains a display region in which a low-photon-flux image may be displayed. The low-photon-flux image may be overlaid on a reference image. If the user clicks on table 108, tool 14 provides the user with options related to image manipulation (e.g., replaying stored image data, etc.)

When the user clicks on live camera tab 102, the image acquisition and processing tool 14 displays screen 92 of FIG. 5. Image display region 110 may be used to display real time images from camera 20. Histogram window 112 contains a histogram 114 corresponding to the currently displayed image. In the histogram, detected pixel brightness levels are displayed on the horizontal axis. The number of pixels in the image that correspond to each brightness level are plotted on the vertical axis.

During setting adjustments for sensor noise threshold filter 68, tool 14 displays a threshold line 116 in window 112. The user can adjust the setting for sensor noise threshold filter 68 by clicking and dragging threshold line 116 to the right or left in window 112. If the user drags line 116 to the right, the sensor noise threshold will be increased. If the user drags line 116 to the left, the sensor noise threshold will be decreased. The currently selected noise threshold setting is displayed in window 118.

When the user presses start button 120, a live camera image is displayed in region 110. When the user presses stop button 122, the currently displayed image is frozen.

Figure 6:
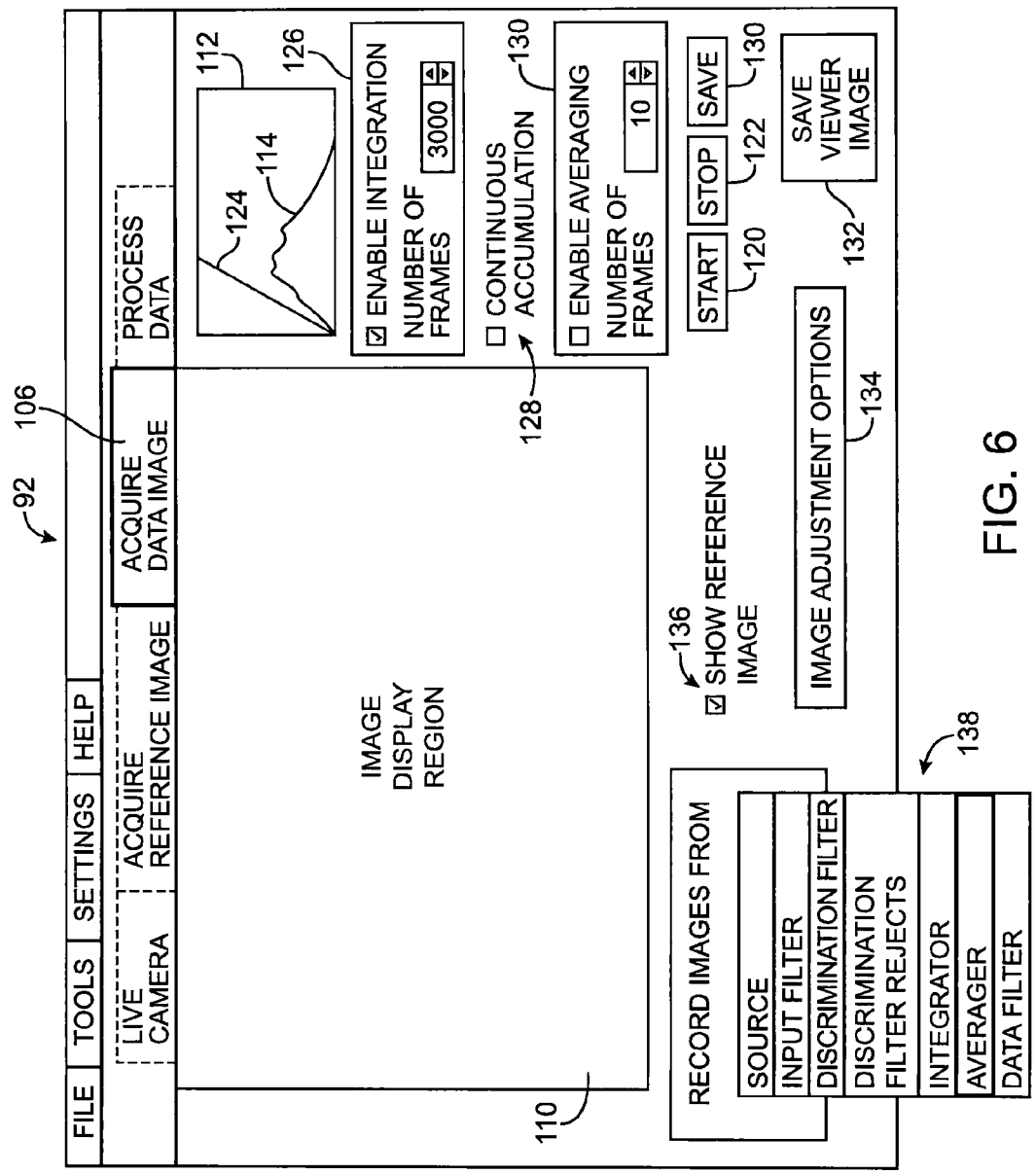
FIG. 6 is an illustrative display screen that may be presented to a user by an image acquisition and processing tool operating in an acquire data image mode in accordance with the present invention.

An illustrative screen 92 that the tool 14 may display for a user when the user clicks on acquire data image tab 106 is shown in FIG. 6. During data acquisition, frames of image data from camera 20 are displayed in image display region 110. A corresponding histogram 114 is displayed in histogram window 112. Grayscale mapping line 124 indicates the mapping applied by tool 14 between detected pixel brightness and displayed brightness. The user of tool 14 can click and drag line 124 to change the shape of grayscale mapping line 124. If, for example, the user reduces the slope of line 124, tool 14 will display images with a reduced contrast.

Settings for integration filter 76 of FIG. 3 may be adjusted using on-screen options 126 of FIG. 6. If the enable integration option is selected, the tool 14 will activate filter 76 and will integrated the selected number of frames. The user can adjust the number of frames to be used during integration (i.e., the number of frames to be digitally integrated to boost camera sensitivity) using up and down arrows, direct text entry of a desired frame number, or using any other suitable technique.

Figure 8:
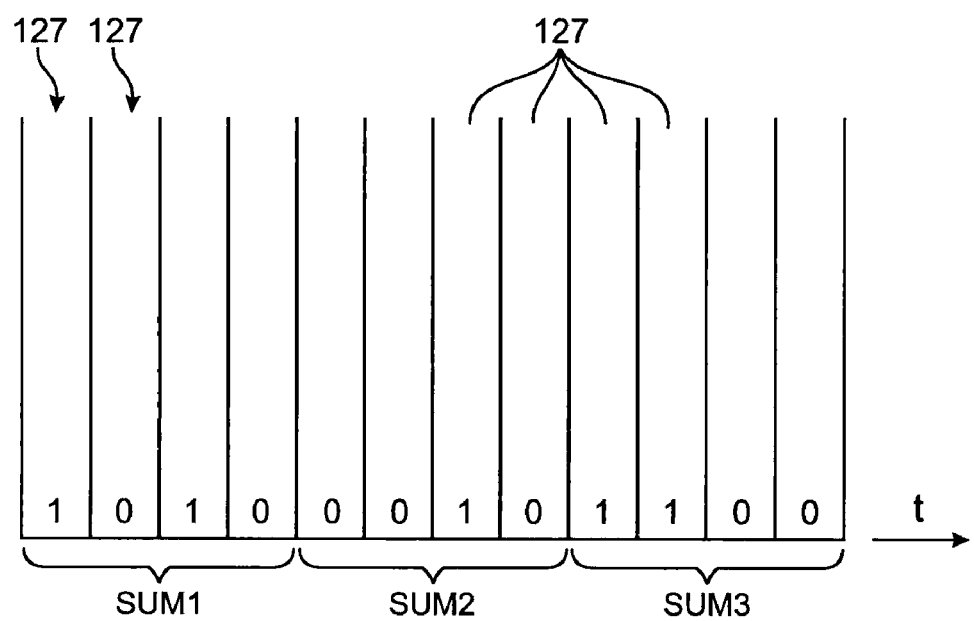
FIG. 8 is a diagram showing how frames of image data may be combined to enhance image acquisition sensitivity in accordance with the present invention.

The temporal integration process performed by integration filter 76 is illustrated in FIG. 8. In FIG. 8, the integration process is illustrated for an individual pixel in a frame (i.e., a pixel at sensor array position x,y). In operation, integration filter 76 operates on all such pixels in a frame and integrates entire frames of acquired image data. As shown in FIG. 8, pixel data at sensor position x,y from groups of frames is combined by integration filter 76 to form sums. When a frame 127 contains a signal at pixel position x,y, the signal is represented by a "1" and when a frame 127 contains no signal at pixel position x,y, the absence of a signal is represented by a "0". In the example of FIG. 8, frames 127 are organized in groups of four frames each. The first group of four frames contains two pixels of data at pixel position x,y, so sum1 is equal to two. The second group of frames contains one pixel at position x,y, so sum2 is equal to one. The third group of frames contains two pixels of data at pixel position x,y, so sum3 is equal to two. Camera sensitivity is improved, because the collective number of pixel signals at position x,y in each group of frames is larger than it would be without temporal integration.

If continuous accumulation option box 128 of FIG. 6 is checked, tool 14 will not refresh the image in region 110 after each block of frames has been captured, but rather will continuously display low-photon-flux images in region 110 as they are acquired. The continuously accumulated image data will build in intensity in real time as photons begin to sum up in identical pixel locations.

Options 130 are used to control the settings of averaging filter 80 (FIG. 3). If the enable averaging box is selected, filter 80 will be activated. The user can adjust the number of frames to include in averaging calculations by direct text entry, by using the up and down arrows in options 130, or using any other suitable technique.

Start button 120 is used to initiate image accumulation operations. Stop button 122 pauses the displayed image. Save option 130 may be selected when it is desired to save raw image data in storage 88 (FIG. 4).

Tool 14 may display a number of image adjustment options 134, such as options related to selecting a false color for the displayed image, etc. Options 134 may be used to adjust the operation of image manipulation filters 84 (FIG. 3).

If the user selects the show reference image option 136, tool 14 will blend a reference image acquired using light-source 18 with low-photon-flux images data frames acquired when light source 18 is off. The blended image is displayed in image display region 110. Data images can be displayed on top of the reference image immediately, from the beginning of a data collection run, so the user is provided with visual feedback in the form of immediate image information.

The user can use options such as the drop-down menu option 138 to select a data extraction point from which to record images. Images may be recorded to a hard disk drive (e.g., a redundant drive) or other suitable storage 88 (FIG. 4). In the example of FIG. 6, the user has highlighted "averager," indicating that the user desires tool 14 to store image data produced at the output of averaging filter 80 (FIG. 4). If the user selects "source" in menu options 138, the tool 14 will store raw image data collected directly from the output of camera 20 in storage 88. If the user selects "input filter" in menu options 138, the tool 14 will store data from the output of sensor threshold filter 68 (i.e., after the operation of sensor threshold filter 68, but before the operation of cosmic ray filter 70). If the user selects "discrimination filter" in menu options 138, the tool 14 will store data from the output of cosmic ray filter 70 (i.e., after the operation of both sensor threshold filter 68 and cosmic ray filter 70). Selection of the "discrimination filter rejects" option directs tool 14 to retain frames that have otherwise been dropped from the image data (e.g., by cosmic ray filter 70). The "integrator" option may be selected if the user desires to store image data after processing by integration filter 76. If the user selects the "data filter" option, data extracted by data extraction filter 78 will be stored. The user can click on save viewer image button 132 to direct tool 14 to save the currently displayed image, as manipulated with false color and other effects produced by image manipulation filters 84 in accordance with the settings supplied using image adjustment options 134.

Figure 7:
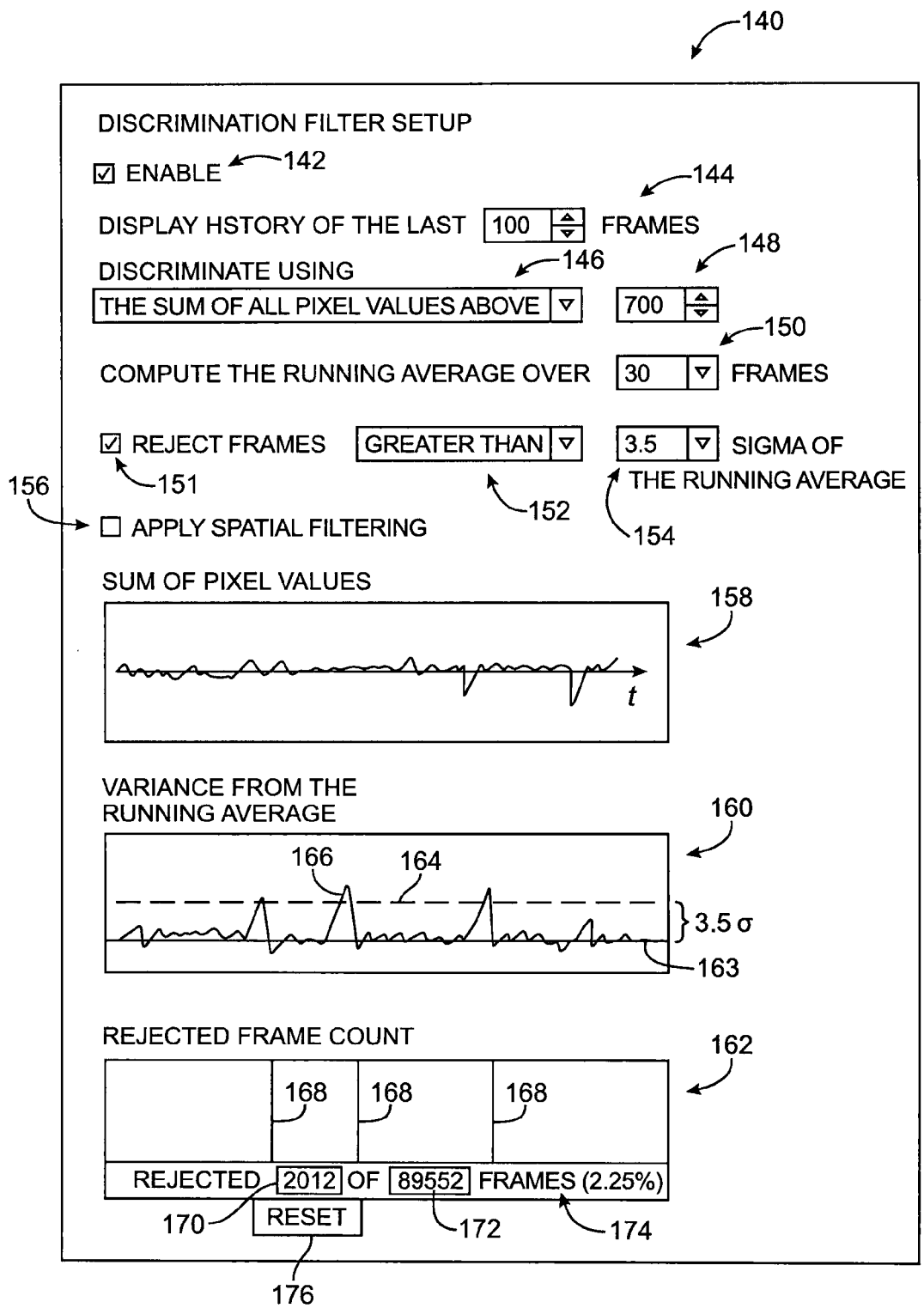
FIG. 7 is an illustrative discrimination filter setup screen that may be presented to a user of an image acquisition and processing tool in accordance with the present invention.

FIG. 7 shows an illustrative screen that may be used by a user of tool 14 to adjust filter settings. Filter adjustment screen 140 may be displayed by tool 14 when, for example, the user selects an appropriate tools option 96 (see, e.g., FIG. 5).

As shown in FIG. 7, filter adjustment screen 140 may include an enable option 142. If enable option 142 is selected, cosmic ray filter 70 (FIG. 3) will be activated. Option 144 is used to control how many frames of image data are displayed in graphs such as graphs 158, 160, and 162.

Option 146 of screen 140 is used to select a cosmic ray filtering technique. In the example of FIG. 7, the selected discrimination technique involves computation of the sum of all pixel values above a threshold amount.

Option 148 has been used to select a brightness threshold value of 700 out of a possible 1024 brightness levels. In general, the threshold may be a default level, may be selected automatically by tool 14, or may be input by a user. Option 150 is used to choose how may image frames are used in computing a running average. The running average is computed for pixels that satisfy the discrimination settings established with options 146 and 148 and forms a baseline count that is used in subsequent filtering operations. The running average is plotted versus time in graph display region 158.

The user can check box 151 if it is desired to drop frames that are determined to contain cosmic ray effects. When the frame dropping option has been selected, the user uses option 152 and option 154 to set up desired cosmic ray detection criteria. In the example of FIG. 7, cosmic rays will be assumed to be present whenever the number of pixels in a given frame that exceed the brightness threshold of 700 (set by option 148) deviate from the running average by more than 3.5 sigma (3.5 standard deviations).

Line 163 in display region 160 represents the running average. Line 164 represents a deviation of 3.5 sigma from the baseline of line 163. The trace 166 corresponds to measured pixel variances from the running average of line 163. Whenever trace 166 exceeds the threshold of line 164, a cosmic ray is present and appropriate action is taken. In the example of FIG. 7, each time trace 166 exceeds the threshold of line 164, a frame is dropped, as represented by the rejected frame lines 168 in display region 162. Region 162 shows information on the number of rejected frames in region 170 and information on the total number of frames in region 172. In region 174, the fraction of frames that have been dropped due to the presence of cosmic ray data is displayed. The user of the tool 14 can reset the cosmic ray filter by clicking on reset option 176.

This type of cosmic ray detection arrangement is most effective at low brightness levels, where frames do not contain multiple photon events. At higher brightness levels, the gain of the camera can be reduced, so that cosmic noise levels become less significant.

In the example of FIG. 7, frames are dropped in their entirety whenever a cosmic ray is detected. If desired, tool 14 may only delete suspect pixels or may replicate clean frames to fill in time gaps that are produced when frames are dropped. Cosmic rays can be identified by applying object size filters that detect regions of an image frame that have a substantially different appearance than a single-photon event. Photon events are typically characterized by Gaussian-link spikes that are highly localized (i.e., spikes that fall within a radius of a few pixels) and that are generally not overly saturated (if the gain of the camera has been adjusted properly). In contrast, cosmic ray strikes are characterized by larger events that contain many saturated pixels.

Figure 9:
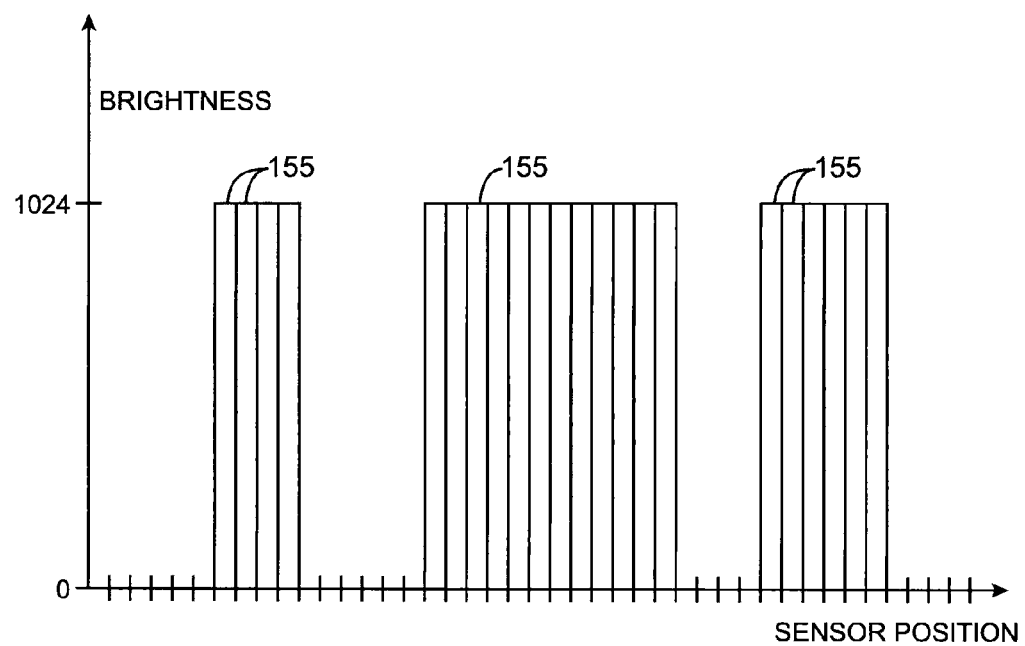
FIG. 9 is a diagram showing a typical response for a row of camera sensor pixels when the camera is struck by a cosmic ray in accordance with the present invention.

FIG. 9 shows an illustrative row of sensor pixels from a frame of image data resulting from a cosmic ray strike. As shown in FIG. 9, there are a large number of closely-located bright pixels. Moreover, pixels 155 have saturated at the maximum brightness level handled by the sensor (1024 in this example). These attributes are characteristic of a cosmic ray strike and can be recognized by cosmic ray filter 70 by examining the spatial information in each frame in addition to or instead of monitoring variations in total pixel levels, as shown in region 160.

As shown by option 156 in FIG. 7, screen 140 may be used to provide the user with an opportunity to adjust settings for spatial integration filter 82. Spatial integration filter 82 may, for example, be used to increase camera sensitivity by combining adjacent pixels to form larger, more sensitive regions, although this approach reduces image resolution. If box 156 is selected, spatial integration filter 82 (FIG. 3) will be active.

Figure 10:
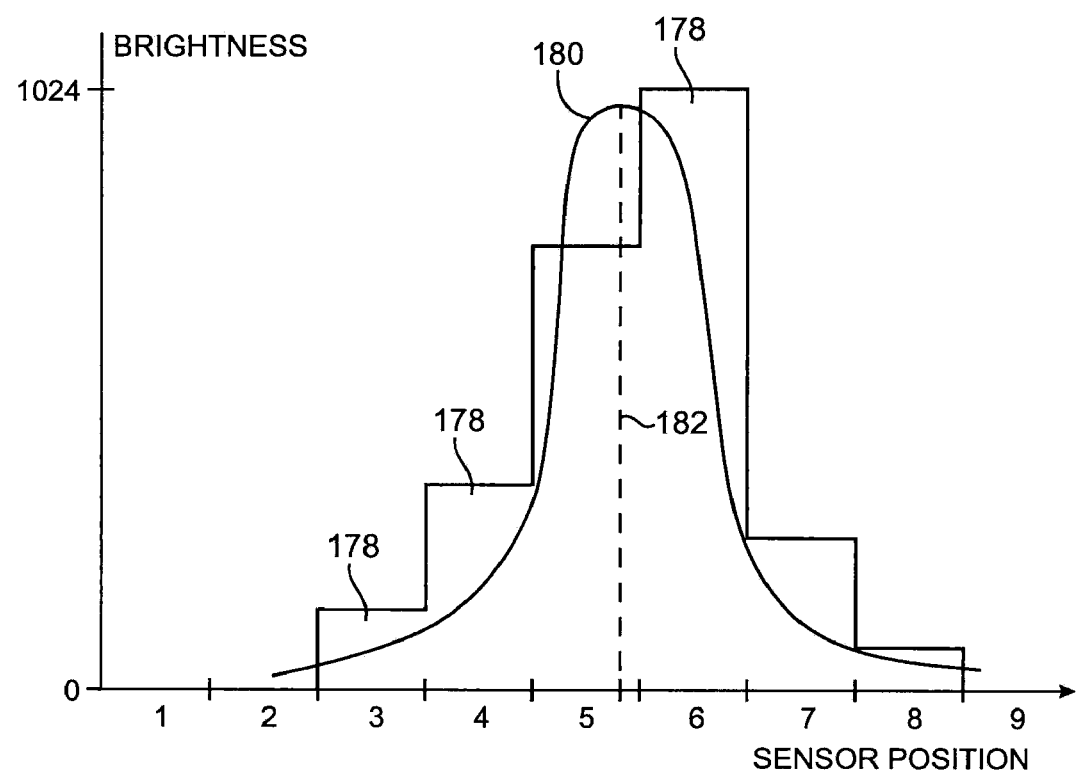
FIG. 10 is a diagram showing a typical response for a row of camera sensor pixels when the camera is struck by a single photon and showing how curve-fitting techniques may be used to identify the photon's location on the sensor to sub-pixel accuracy in accordance with the present invention.

Photon shape optimization filter 72 may be used to increase position accuracy in the acquired image. A typical set of pixel intensities that result when sensor 48 detects a single-photon strike are shown in FIG. 10. In the graph of FIG. 10, detected pixel brightness is plotted as a function of pixel position for an illustrative row of pixels in sensor 48. A typical sensor 48 may have 1000×1000 pixels, but a one-dimensional plot of nine representative pixels in the vicinity of the photon strike are shown in FIG. 10. Pixels 178 in the vicinity of the photon strike typically have brightness levels less than the maximum detection limit of the sensor (1024 in this example). Moreover, pixels 178 have a Gaussian distribution of brightness levels. The most intense pixel 178 is roughly in the center of the photon strike. The periphery of the photon strike region is characterized by less intense pixels.

With one suitable approach, tool 14 uses the pixel position of the most intense pixel as the position of the photon. With this type of arrangement, the photon is said to have struck at pixel position 6.

If desired, a significantly more accurate position may be generated by fitting a curve (i.e., a Gaussian curve) to the set of all pixels 178 that are associated with the photon strike using photon shape optimization filter 72. As shown in the example of FIG. 10, the curve fit may result in a center point for the Gaussian that is not exactly centered over one of the pixels in the sensor array of sensor 48. The center point of the Gaussian curve 180 of FIG. 10 is represented by pixel position 5.7 (i.e., a point that lies between pixels 5 and 6). Sub-pixel photon data of this type may be generated in two dimensions by using photon shape optimization filter 72 in tool 14 to perform centroid calculations on detected photons.

Such centroid calculations may be performed whenever tool 14 detects an event that involves several adjacent pixels. Once a centroid calculation has been performed and the location of the photon strike has been determined, memory requirements for storing the image data can be reduced by representing the image frame containing the photon strike using a vector format (i.e., x-y position data and optional brightness information for each detected photon). Vector data of this type can be preserved as image data, can be used as photon count data, or can be used for further processing. If desired, the portion of a frame that contains a detected photon strike can be replaced with idealized (e.g., Gaussian) pixel data or other suitable data (e.g., a pattern of pixels representing a photon strike).

Figure 11:
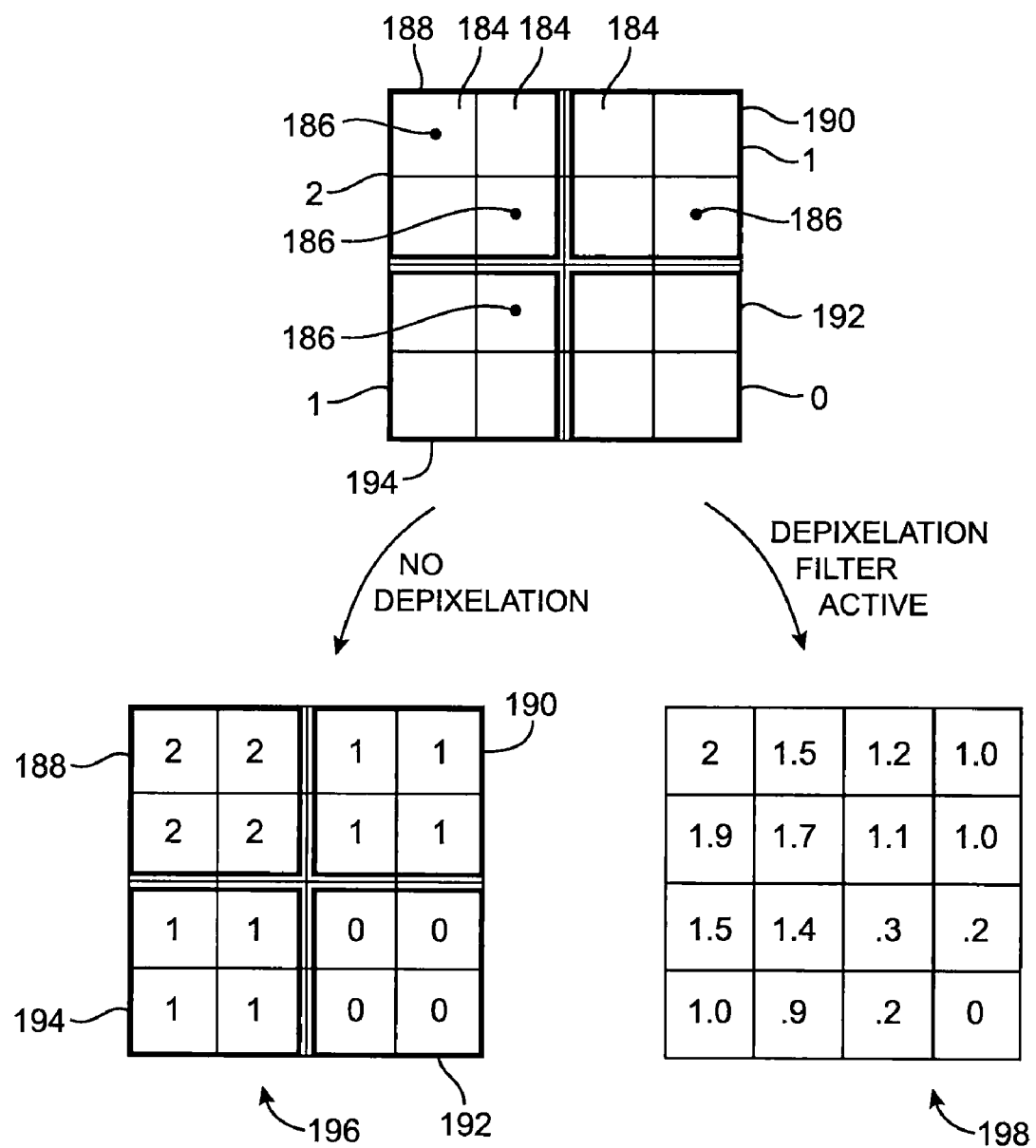
FIG. 11 is a diagram showing how two-dimensional spatial processing techniques may be used to enhance camera sensitivity and to reduce pixelation in accordance with the present invention.

If photon flux levels are low and photon strikes are relatively sparse in each frame, tool 14 may use spatial integration filter 82 to increase the effective pixel size of the sensor by combining adjacent pixels to form larger pixels. This type of operation is shown in FIG. 11. In the example of FIG. 11, sensor 48 has 16 pixels 184 arranged in a 4×4 array. Pixels 184 that have been struck by a photon are illustrated schematically by dots 186. During image processing, tool 14 combined the four pixels 184 in each of the four corners of the array to form four larger effective pixels 188, 190, 192, and 194, each containing four pixels 184. Each of the larger pixels contains a potentially increased number of photon strikes in proportion to its increased area. For example, enlarged pixel 188 contains two photons, enlarged pixel 190 contains one photon, enlarged pixel 192 contains zero photons, and enlarged pixel 194 contains 1 photon.

If desired, tool 14 can use a depixelation function to smooth the image data. When tool 14 does not implement depixelation, image data of the type shown in array 196 is produced. In array 196, a count value corresponding to each enlarged pixel is assigned to each individual pixel 184. When the depixelation function is active, tool 14 adjusts the individual pixel values to smooth the boarders between the enlarged pixels.

Figure 12:
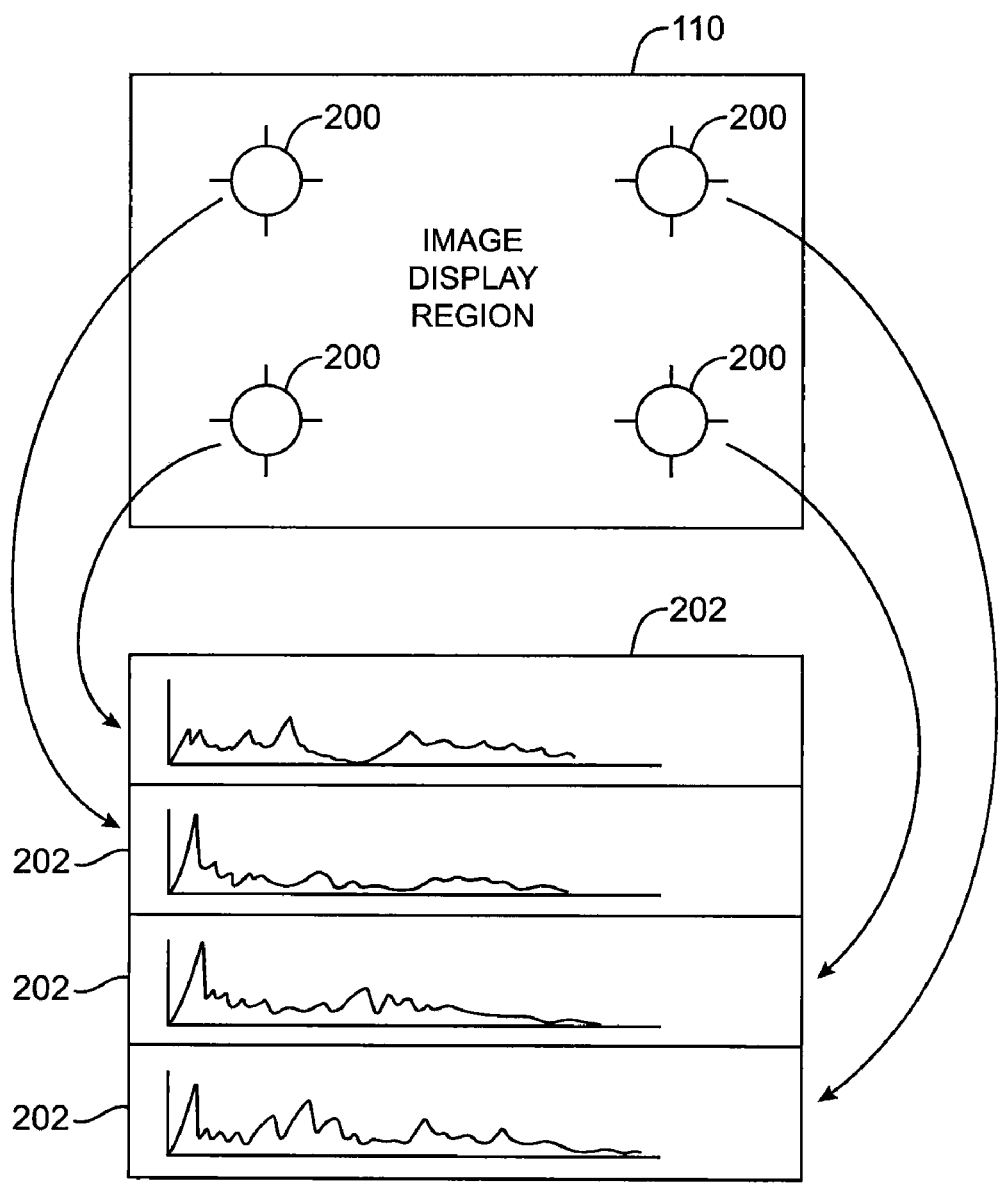
FIG. 12 is a diagram showing how a user of the image acquisition and processing tool can define regions of interest that are used to selectively capture and process camera data in accordance with the present invention.

As described in connection with data extraction filter 78 (FIG. 3), a user of tool 14" can define regions of interest in an image. Image data can be extracted from the regions of interest and image data outside of the regions of interest can be ignored. An example is shown in FIG. 12. In the example of FIG. 12, target 24 is a well plate containing four wells. The user of tool 14 has used suitable commands such as drag and drop commands to align ROI markers 200 on top of the well plate locations. During image acquisition, data outside of the regions 200 is ignored. Data within each region 200 is used to generate a respective pixel count strip chart 202. The data from strip charts 202 may be displayed for the user on display 86 (FIG. 4), stored in storage 88, or otherwise processed by the image acquisition and processing tool 14.

Advantageously, the image processing functions of the pipeline processing filters operate on image data frames that have been preprocessed by preprocessing filters 64. Preprocessing filters 64 are able to assure that each image data frame contains high quality data. This is achieved by using frame rates that are sufficiently fast. With sufficiently fast frame rates, single-photon signals can be easily identified and preserved while non-photon signals (noise) can be detected and removed. As a result, after the preprocessing operations of filters 64 have been performed, only high-quality photon signals are processed by the pipeline processing filters 66.

Figure 13:
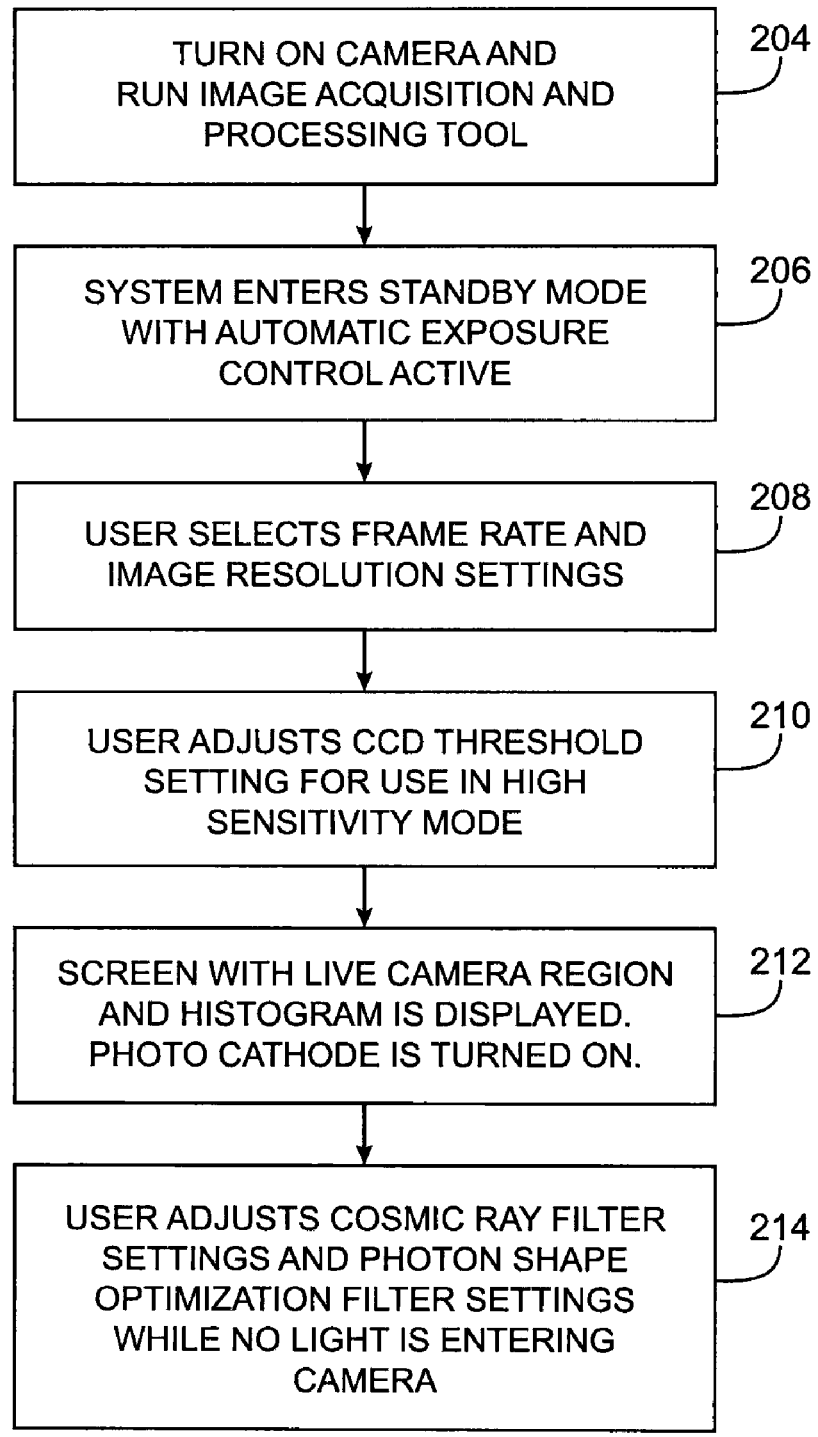
FIG. 13 is a flow chart of illustrative setup steps involved in operating an image acquisition and processing tool in accordance with the present invention.

Illustrative steps involved in using image acquisition and processing tool 14 to set up filter parameters and make other tool adjustments are shown in FIG. 13.

At step 204, a user turns on the camera 20 and launches the image acquisition and processing tool 14.

At step 206, the system 10 enters standby mode, with the camera operating in automatic exposure control mode. In automatic exposure control mode, the user need not manually adjust camera settings to obtain a correctly exposed image. Upon powering on the camera, the system is in a quiescent state, the photocathode 38 is turned off by tool 14, and the sensor 48 is gathering noise signals.

At step 208, the user uses tool options such as the drop-down menu options 96 and 98 of screen 92 in FIG. 5 to make frame rate and image resolution settings for camera 20. As an example, the user may select a frame rate of 50 frames/second (or any other suitable frame rate) and may select "full resolution mode" (or any other suitable resolution).

At step 210, the user optionally adjusts the CCD threshold setting using the threshold adjustment line 116, as described in connection with FIG. 5. During step 210, the user uses tool 14 to ensure that the iris 30 and shutter 26 (FIG. 2) are closed. The light-tight enclosure 16 (FIG. 1) may also be closed and the reference light source 18 may be turned off. The user then clicks on an appropriate button such as the live camera tab 102 to invoke live camera mode. Under these conditions, with the photocathode off, the sensor 48 is only measuring CCD noise, so the image histogram 114 is located in the left-hand (low brightness) region of histogram window 112, as shown in the example of FIG. 5. If desired, a default threshold setting or a setting that has been automatically determined by the camera may be used.

At step 212, with the tool 14 in live camera mode, the tool displays a screen such as screen 92 of FIG. 5 on display 86

(FIG. 4). The screen preferably contains an image display region 110 containing a real time image from camera 20. The histogram window 112 is also typically displayed. Tool 14 turns the photocathode 38 on and ensures that the gain of the microchannel plate 40 is set at an appropriate level for low-photon-flux imaging. Typically, the gain of the camera 20 is adjusted so that a single photon strike would produce a pixel brightness level of about 50-100% of the sensor's maximum (saturation) level without saturating. Because no light is being gathered from target 24, the only photons being detected by sensor 48 are being produced by cosmic rays and dark counts.

At step 214, the user uses tool 14 to adjust settings for cosmic ray filter 70. In particular, the user can adjust cosmic ray detection and processing settings using options such as options 146, 148, 150, 151, 152, and 154 of FIG. 7. Once the settings of cosmic ray filter 70 have been adjusted, the tool 14 may be used to acquire image data for a study.

Figure 14:
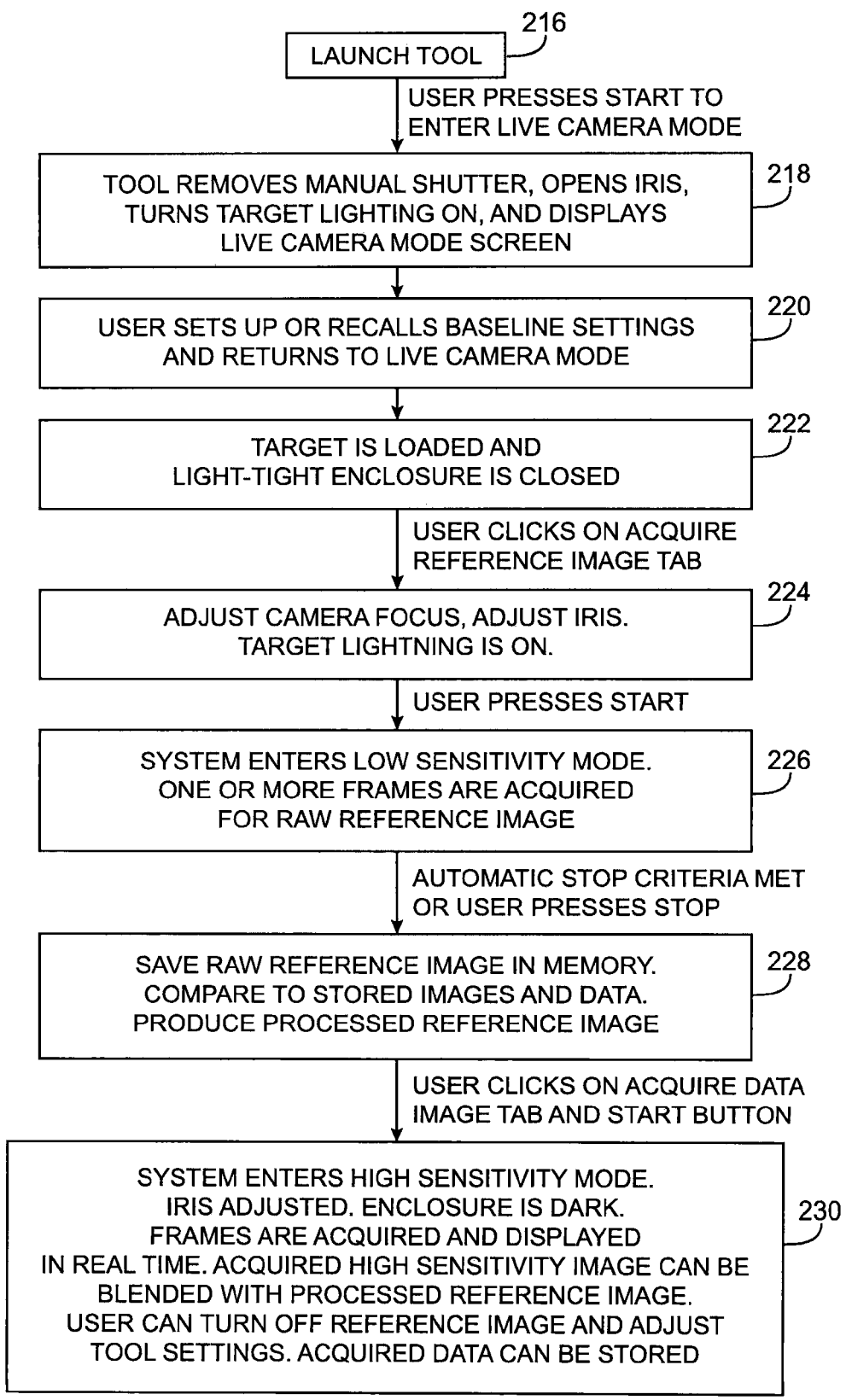
FIG. 14 is a flow chart of illustrative steps involved in using an image acquisition and processing tool in accordance with the present invention.

Illustrative steps involved in capturing image data during normal use of image acquisition and processing tool 14 are shown in FIG. 14. In the example of FIG. 14, the user may be conducting a study by imaging a live animal, a cell culture, a light-emitting substance, or any other suitable target.

At step 216, the user launches tool 14. Tool 14 may be launched, for example, by clicking on a desktop icon on computer system 12.

After launching the tool 14, the user clicks on an appropriate tool option to place the tool 14 in live camera mode. In live camera mode, the tool 14 displays a screen such as screen 92 of FIG. 5. In preparation for gathering image data, tool 14 opens shutter 26 and turns light source 18 on. Iris 30 may be set to an appropriate size. With one suitable approach, iris 30 is fully opened.

At step 220, the user sets up or recalls baseline settings for tool 14. The user then returns to live camera mode.

At step 222, the user ensures that the target 24 has been properly positioned within light-tight enclosure 16. The light-tight enclosure 16 is then closed to prevent stray light from striking target 24 and entering camera 20.

After the target has been loaded, the user clicks on tab 104 to direct tool 14 to prepare tool 14 for acquiring a reference image of target 14. At step 224, the user manually adjusts the focus of camera 20 or tool 14 uses camera controller 52 to adjust lens 28 to focus camera 20 on the target 24. The iris 30 may also be adjusted. For example, the tool 14 may close the iris to enhance the depth of field for the acquired image. The light source 18 is turned on by tool 14, so that the target is illuminated. The light source 18 may be set up to reflect light off of target 24 or to transmit light through target 24. The tool 14 displays an image display region and control buttons such as start and stop buttons 120 and 122 of FIG. 5.

After the camera has been focused and the setup operations of step 224 have been completed, the user may click on a start button on the acquire reference image screen. This directs system 10 to enter a low sensitivity mode that is appropriate for gathering a reference image with a relatively large brightness at step 226. In low sensitivity mode, the frame rate of the image sensor 48 is typically at about 10-100 Hz (i.e., the native frame rate of sensor 48). The photocathode typically is turned on with a duty cycle of about $10^{-3}$ to $10^{-5}$ (i.e., the photocathode is biased for a 10 μs pulse during each 10 ms frame). The overall gain of the camera is generally set to less than $10^4$ (e.g., about $10^3$) by adjusting the voltage on microchannel plate 40. Placing the camera 20 in a low-sensitivity operating mode allows the LED light source 18 to be operated in a stable linear regime.

While in low-sensitivity mode, one or more frames of reference image data are acquired by tool 14 to form a grayscale raw reference image. While the image is being captured, a live display of the image may be presented to the user in an image display region on monitor 86. When tool 14 detects that suitable criteria have been satisfied or when manually directed by the user (e.g., by pressing a stop button), tool 14 stops acquiring the reference image.

At step 228, the raw reference image that has been acquired is stored in memory (e.g., storage 88). The user may use tool 14 to compare the reference image to stored images and data. For example, the user may retrieve previously captured images to compare to the raw reference image. The raw reference image may also be manipulated using image manipulation filters 84 (e.g., to colorize the grayscale image, to adjust the contrast of the grayscale image, etc.).

After desired image manipulation operations have been performed, the user clicks on acquire data image tab 106 to initiate the process of acquiring low-photon-flux images (i.e., images with few, tens, or hundreds of photons/frame and preferably fewer than two photons/pixel).

At step 230, tool 14 places system 10 in a high sensitivity image capture mode. In high sensitivity mode, the iris 30 is typically opened to increase the light gathering power of the camera 20. The frame rate of the image sensor 48 is set to a frame rate that is appropriate for the type of target 24 that is being imaged. The duty cycle of the control signal applied to the photocathode 38 is typically raised to 100%. The gain of the camera is generally adjusted to a level greater than $10^4$ (e.g., a gain of about $5 \times 10^5$ to $10^6$) by adjusting the high voltage that is applied to the microchannel plate 40.

After the system 10 has been placed in the high sensitivity mode, frames of image data are acquired and are displayed in real time in image display region 110 of FIG. 6 in combination with the reference image. As described in connection with FIG. 6, the acquired data image is preferably displayed immediately, without the large (five minute) delay times associated with conventional integration arrangements. The acquired data image can be displayed simultaneously in combination with the reference image as a blended or overlaid image. Because the user can observe whether the image data is being properly acquired without significant delay, the user can abort the run or adjust the settings of tool 14 if necessary. The simultaneous display of the reference image with the acquired low-photon-flux data image allows the user to check whether the data is being received from the target correctly. As described in connection with FIGS. 3 and 4, image processing filters 64 and 66 may be used to ensure that the image data is acquired, displayed, and stored as desired.

During step 230, the image manipulation filter 84 can be used to combine the reference image and acquired data frames using any suitable technique (e.g., superimposition of images, blending with controllable transparency, alpha-blending with controllable mixing coefficients, etc.).

During step 230 and during other normal operations of tool 14, the user can adjust the settings of tool 14. Operations involved in adjusting tool 14 during normal operation are shown in FIG. 15.

Figure 15:
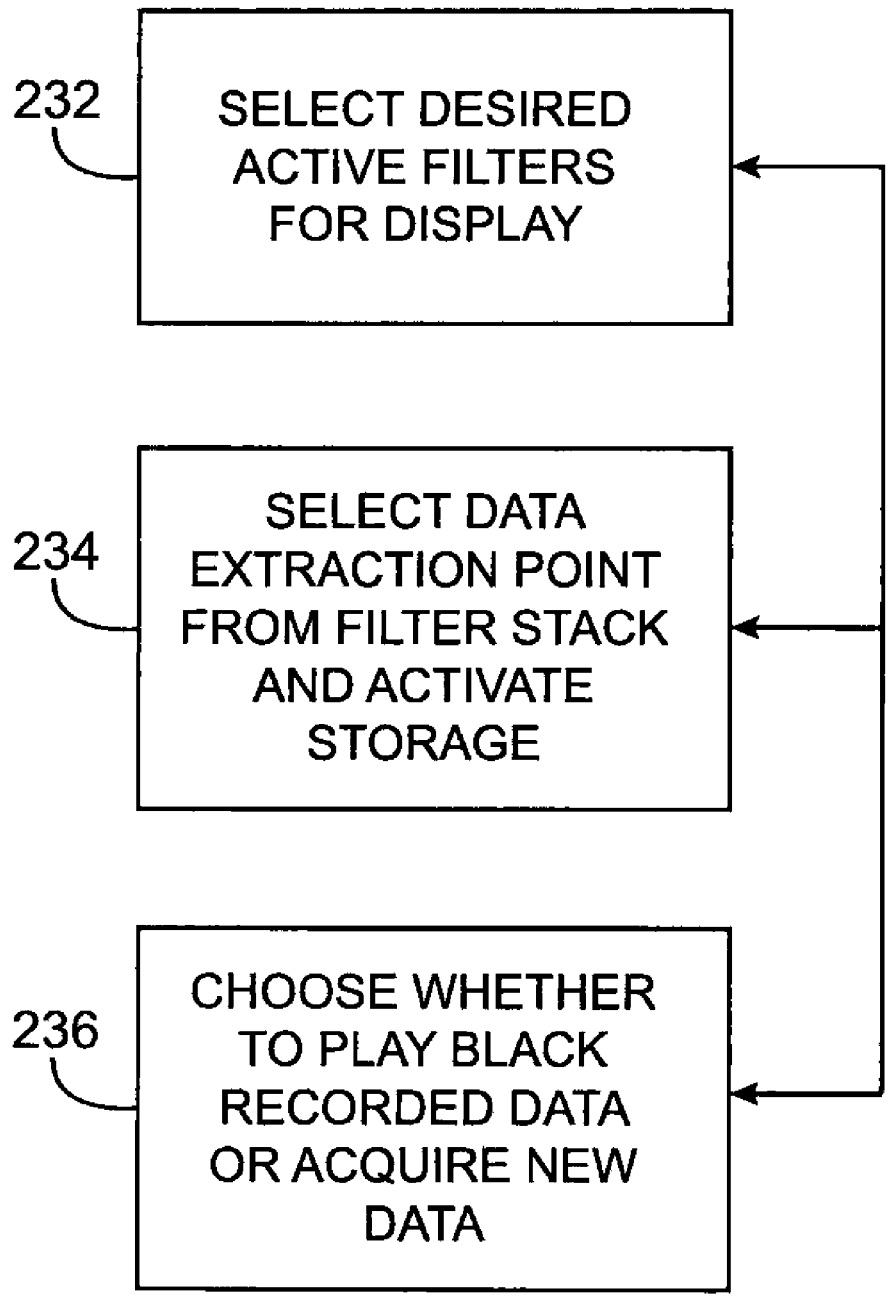
FIG. 15 is diagram of illustrative steps involved in adjusting filter, data storage, and playback options in an image acquisition and processing tool in accordance with the present invention.

As shown by step 232 of FIG. 15, a user of tool 14 can select which of the filters 64 and 66 are active at a given time. Different filters can be used when storing data, when acquiring raw image data, and when playing back previously recorded data. The user can, as an example, record raw image data to a hard disk. Later, the user can play back the recorded image data with tool 14. As the recorded data is played back, the user can activate and deactivate filters to examine whether the recorded data can be enhanced. For example, the user can activate or deactivate averaging filter 80 to examine whether averaging is needed to process the image data. The user can also adjust averaging settings (e.g., the number of frames included in the average computations). As another example, the user can activate different sets of filters within the chain of filters in tool 14 during data storage and simultaneous real-time display operations. With this approach, the tool 14 applies a first subset of the chain of image processing filters to acquired image data frames that are being recorded and applies a second subset of the chain of image processing filters to acquired image data frames that are being displayed in real time. The first and second subsets can be identical or different.

As shown by step 234, the user can select a desired data extraction point from the chain of filters in FIG. 4 from which to store data to storage 88 (FIG. 4). The user may, for example, use a drop-down menu format of the type described in connection with menu options 138 of FIG. 6. The user may selectively activate and deactivate the various image processing filters 64 and 66 that are being applied to the stored data. Data may be recorded to storage 88 with a selected set of filters at the same time that data is displayed on display 86 with a potentially different set of filters.

As shown by step 236, the user can instruct tool 14 to play back recorded data or to acquire new data. The user may play back recorded data to evaluate the impact of filter adjustments or to review results. On-screen options such as start, stop, and save buttons, or any other suitable user interface may be used to allow the user to control the recording and playback functions of tool 14.

The foregoing is merely illustrative of the principles of this invention and various modifications can be made by those skilled in the art without departing from the scope and spirit of the invention.

What is claimed is:

1. A method for using an image acquisition and processing tool implemented on a computer system to analyze a target in a camera system that has a light-tight enclosure surrounding the target, a reference light source, and a camera, the method comprising:
    turning the reference light source on to illuminate the target with the reference light source;
    using the image acquisition and processing tool to place the camera in a low-sensitivity mode;
    while the camera is in the low-sensitivity mode and while the target is illuminated with the reference light source, acquiring a reference image of the target;
    using the image acquisition and processing tool to place the camera in a high-sensitivity mode;
    turning the reference light source off;
    while the camera is in the high-sensitivity mode and while the reference light source is off, acquiring low-photon-flux image data frames with the camera that contain photons received from the target and that contain noise signals, wherein the image data frames are acquired with the camera at a frame rate that is sufficiently fast to ensure that the photons are individually resolved within each acquired image data frame;
    processing the acquired image data frames to remove the noise signals while retaining the individually resolved photons; and
    displaying the processed acquired image data frames in real time in combination with the acquired reference image.

2. The method defined in claim 1 further comprising using the image acquisition and processing tool to perform centroid calculations to determine the locations of the individually-resolved photons within the image data frames with subpixel accuracy.

3. The method defined in claim 1 wherein the camera contains a photocathode, a microchannel plate, and gain control and photocathode gating circuitry, and wherein using the image acquisition and processing tool to place the camera in the low-sensitivity mode and the high-sensitivity mode comprises using the gain control and photocathode gating circuitry to adjust gain settings for the microchannel plate and duty cycle settings for the photocathode.

4. The method defined in claim 1 wherein the camera is an intensified charge-coupled-device camera that contains a photocathode, a microchannel plate, and gain control and photocathode gating circuitry, wherein using the image acquisition and processing tool to place the camera in the low-sensitivity mode and the high-sensitivity mode comprises using the gain control and photocathode gating circuitry to adjust gain settings for the microchannel plate and duty cycle settings for the photocathode, wherein in the high-sensitivity mode the camera has a gain of greater than $10^4$, and wherein in the low-sensitivity mode the camera has a gain of less than $10^4$.

5. The method defined in claim 1 wherein the camera is an intensified charge-coupled-device camera that contains a GaAsP photocathode, a dual microchannel plate, gain control and photocathode gating circuitry, and a lens having an iris, wherein using the image acquisition and processing tool to place the camera in the low-sensitivity mode and the high-sensitivity mode comprises using the gain control and photocathode gating circuitry to adjust gain settings for the dual microchannel plate and duty cycle settings for the GaAsP photocathode, wherein in the high-sensitivity mode the camera has a gain of greater than $10^4$, and wherein in the low-sensitivity mode the camera has a gain of less than $10^4$, the method further comprising using the image acquisition and processing tool to adjust the lens and the iris before acquiring the reference image in the low-sensitivity mode.

6. The method defined in claim 1 wherein the camera comprises a sensor, the method further comprising using the image acquisition and processing tool to display an on-screen option on the computer system that allows a user to adjust a noise threshold setting for the sensor.

7. The method defined in claim 1 wherein the camera comprises a sensor, the method further comprising using the image acquisition and processing tool to display an on-screen histogram with a movable threshold selection indicator on the computer system that allows a user to adjust a noise threshold setting for the sensor.

8. The method defined in claim 1 wherein the image acquisition and processing tool comprises a cosmic ray software filter implemented on the computer system and wherein processing the acquired image data frames to remove the noise signals while retaining the individually resolved photons comprises using the cosmic ray software filter implemented on the computer system to filter cosmic rays from the acquired image data frames.

9. The method defined in claim 1 wherein the image acquisition and processing tool comprises a chain of image processing software filters implemented on the computer system that process the acquired image data frames, the method further comprising selectively activating a subset of the chain of image processing software filters.

10. The method defined in claim 1 further comprising, as the acquired image data frames are displayed in real time, simultaneously recording the acquired image data frames in storage.

11. The method defined in claim 1 wherein the image acquisition and processing tool comprises a photon shape optimization software filter implemented on the computer system, the method further comprising using the photon shape optimization software filter to replace a detected photon in the acquired image data frames using an idealized photon pixel brightness profile.

12. The method defined in claim 1 wherein the image acquisition and processing tool comprises a chain of image processing software filters implemented on the computer system, the method further comprising using the image acquisition and processing tool to display an on-screen option on the computer system that allows a user to set a desired data extraction location in the chain of image processing software filters.

13. The method defined in claim 1 further comprising:
storing the reference image and the acquired image data frames in storage in the computer system; and
playing back the stored reference image and acquired image data frames on a display in the computer system using the image acquisition and processing tool.

14. The method defined in claim 1 wherein processing the acquired image data frames to remove the noise signals while retaining the individually resolved photons comprises:
using a cosmic ray filter in the image acquisition and processing tool to determine when a sum of pixel values in an acquired image data frame varies by more than a given amount from an average pixel value; and
when the sum of pixel values varies by more than the given amount for a particular frame, dropping that frame to filter out cosmic ray effects from the acquired image data frames.

15. The method defined in claim 1 wherein each acquired image data frame contains an array of pixels, the method further comprising using the image acquisition and processing tool to combine pixel signals from sets of adjacent pixels to increase imaging sensitivity.

16. The method defined in claim 1 wherein each acquired image data frame contains an array of pixels, the method further comprising:
using the image acquisition and processing tool to combine pixel signals from sets of adjacent pixels to increase imaging sensitivity; and
using the image acquisition and processing tool to apply a depixelation filter to the combined pixel signals.

17. The method defined in claim 1 wherein the target comprises a well plate containing multiple wells, each well containing a bioluminescent sample, the method further comprising:
using the image acquisition and processing tool to allow a user to define regions of interest in the acquired image data frames that coincide with the bioluminescent samples in the well plates; and
extracting image data signals from the user-defined regions of interest using the image acquisition and processing tool.

18. The method defined in claim 1 wherein the image acquisition and processing tool comprises a sensor threshold filter, a cosmic ray filter, and a photon shape optimization filter, the method comprising:
using the sensor threshold filter to reduce sensor noise in the acquired image data frames;
after the sensor threshold filter has been used to reduce noise, using the cosmic ray filter to reduce cosmic ray effects in the acquired image data frames; and
after the cosmic ray filter has been used to reduce the cosmic ray effects, using the photon shape optimization filter to process single photon strikes in the acquired image data frames.

19. The method defined in claim 1 wherein the image acquisition and processing tool comprises a sensor threshold filter, a cosmic ray filter, an integration filter, and an averaging filter, the method comprising:
using the sensor threshold filter to reduce sensor noise in the acquired image data frames;
after the sensor threshold filter has been used to reduce noise, using the cosmic ray filter to reduce cosmic ray effects in the acquired image data frames;
after the cosmic ray filter has been used to reduce the cosmic ray effects, using the integration filter to increase imaging sensitivity by combining sets of the acquired image data frames; and
after the integration filter has been used, applying the averaging filter to average at least some of the acquired image data frames.

20. The method defined in claim 1 wherein the image acquisition and processing tool comprises a sensor threshold filter, a cosmic ray filter, an integration filter, an averaging filter, and an image manipulation filter, and wherein the reference image comprises a grayscale reference image, the method comprising:
using the sensor threshold filter to reduce sensor noise in the acquired image data frames;
after the sensor threshold filter has been used to reduce noise, using the cosmic ray filter to reduce cosmic ray effects in the acquired image data frames;
after the cosmic ray filter has been used to reduce the cosmic ray effects, using the integration filter to increase imaging sensitivity by combining sets of the acquired image data frames;
after the integration filter has been used, applying the averaging filter to average at least some of the acquired image data frames; and
after applying the averaging filter, applying the image manipulation filter to produce a false color for the grayscale reference image.

21. The method defined in claim 1 wherein the image acquisition and processing tool comprises an image manipulation software filter implemented on the computer system that combines the reference image and the acquired image data frames, the method further comprising using the image manipulation software filter to adjust blending settings for combining the reference image and the acquired image data frames.

22. The method defined in claim 1 further comprising as the acquired image data frames are displayed in real time, simultaneously recording the acquired image data frames in storage, wherein the image acquisition and processing tool comprises a chain of image processing filters that process the acquired image data frames, the method further comprising applying a first subset of the chain of image processing filters to the acquired image data frames that are being recorded and applying a second subset of the chain of image processing filters to the acquired image data frames that are being displayed in real time, wherein the first and second subsets are different.

23. The method defined in claim 1 wherein the frame rate at which the image data frames are acquired with the camera is at least 0.1 frames per second.

24. The method defined in claim 1 wherein the frame rate at which the image data frames are acquired with the camera is between 1 frame every ten seconds and 100 frames per second.

25. The method defined in claim 1 further comprising:

combining a plurality of the acquired image data frames together.

26. The method defined in claim 1 wherein each of the acquired image data frames includes an insufficient number of photons to form an identifiable image, the method further comprising:

combining a plurality of the acquired image data frames together to form an identifiable image.

* * * * *